United States Patent
Edelman et al.

(10) Patent No.: US 12,436,063 B1
(45) Date of Patent: Oct. 7, 2025

(54) BEARING BALL INSPECTION SYSTEM

(71) Applicant: Vallum Software, LLC, Peachtree Corners, GA (US)

(72) Inventors: Lance Edelman, Atlanta, GA (US); Mahdi Bagheri, Duluth, GA (US); Robert Alan Edelman, Farmington, UT (US)

(73) Assignee: Vallum Software, LLC, Peachtree Corners, GA (US)

( * ) Notice: Subject to any disclaimer, the term of this patent is extended or adjusted under 35 U.S.C. 154(b) by 0 days.

(21) Appl. No.: 19/220,651

(22) Filed: May 28, 2025

Related U.S. Application Data

(60) Provisional application No. 63/661,918, filed on Jun. 20, 2024.

(51) Int. Cl.
| | |
|---|---|
| *G01M 13/04* | (2019.01) |
| *G06T 7/00* | (2017.01) |
| *H04N 23/56* | (2023.01) |
| *H04N 23/73* | (2023.01) |
| *H04N 23/90* | (2023.01) |

(52) U.S. Cl.
CPC ........... *G01M 13/04* (2013.01); *G06T 7/0004* (2013.01); *H04N 23/56* (2023.01); *H04N 23/73* (2023.01); *H04N 23/90* (2023.01); *G06T 2207/20081* (2013.01)

(58) Field of Classification Search
CPC ................ G01M 13/04; H04N 23/56
See application file for complete search history.

(56) References Cited

U.S. PATENT DOCUMENTS

| | | | |
|---|---|---|---|
| 11,635,346 B1* | 4/2023 | Compagnat | G01N 21/951 |
| | | | 348/135 |
| 12,367,585 B2* | 7/2025 | Zhang | G06T 7/11 |
| 2013/0313169 A1* | 11/2013 | Lapeyre | B07C 5/00 |
| | | | 209/606 |
| 2021/0374111 A1* | 12/2021 | Harvey | G01C 21/3837 |
| 2021/0396686 A1* | 12/2021 | Boettger | G01N 23/043 |
| 2022/0125969 A1* | 4/2022 | Gaska | A61L 2/26 |
| 2022/0130178 A1* | 4/2022 | Kujacznski | G01N 21/85 |
| 2024/0393295 A1* | 11/2024 | Jack | G01N 29/46 |
| 2025/0008225 A1* | 1/2025 | Lee | H04N 23/73 |

* cited by examiner

*Primary Examiner* — Jayanti K Patel
*Assistant Examiner* — Christopher Kingsbury Glover
(74) *Attorney, Agent, or Firm* — H. Brock Kolls

(57) ABSTRACT

The present invention relates to a bearing ball inspection system configured for automated non-destructive testing of spherical components. In an exemplary embodiment, a bearing ball is delivered to an inspection point by a rail guide and supported by a positioning wheel configured to rotate the bearing ball during imaging. Cameras capture images of different surface regions under controlled illumination provided by ultraviolet or white-light sources. A control system comprising a microprocessor and memory executes a machine learning model to analyze the images and detect surface defects without requiring manual interpretation. Based on the analysis, a sorting mechanism directs the bearing ball to a pass or fail location. The system further includes communication interfaces configured to transmit inspection results to a remote computing device and receive control instructions. This integrated architecture enhances inspection reliability, improves throughput, reduces inspection variability, and supports centralized management of inspection systems across distributed production sites.

20 Claims, 16 Drawing Sheets

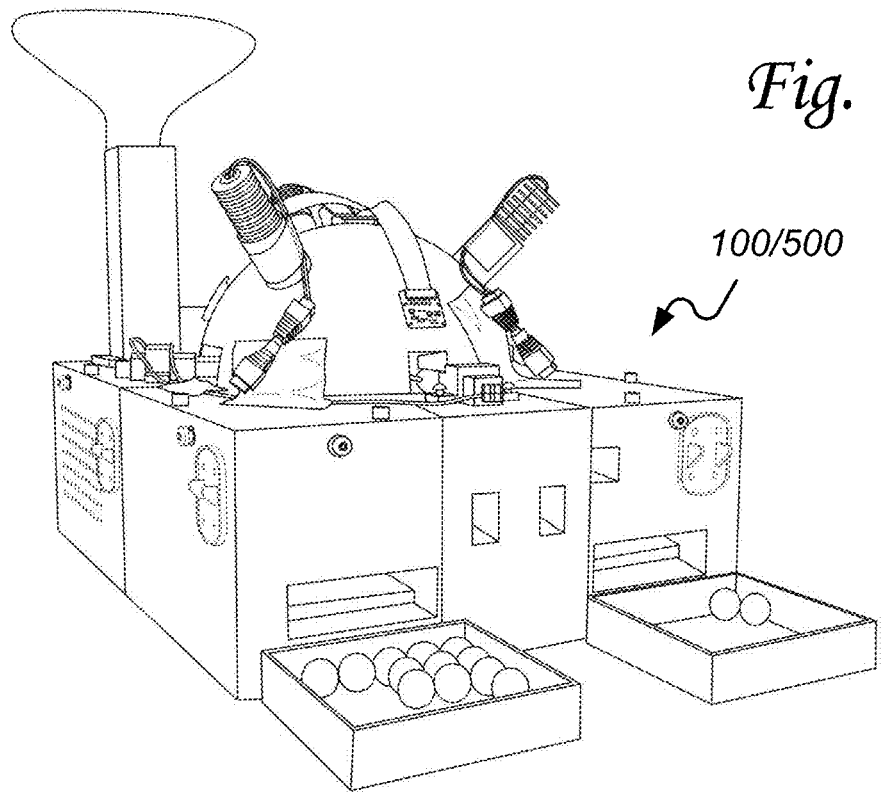
Fig. 10
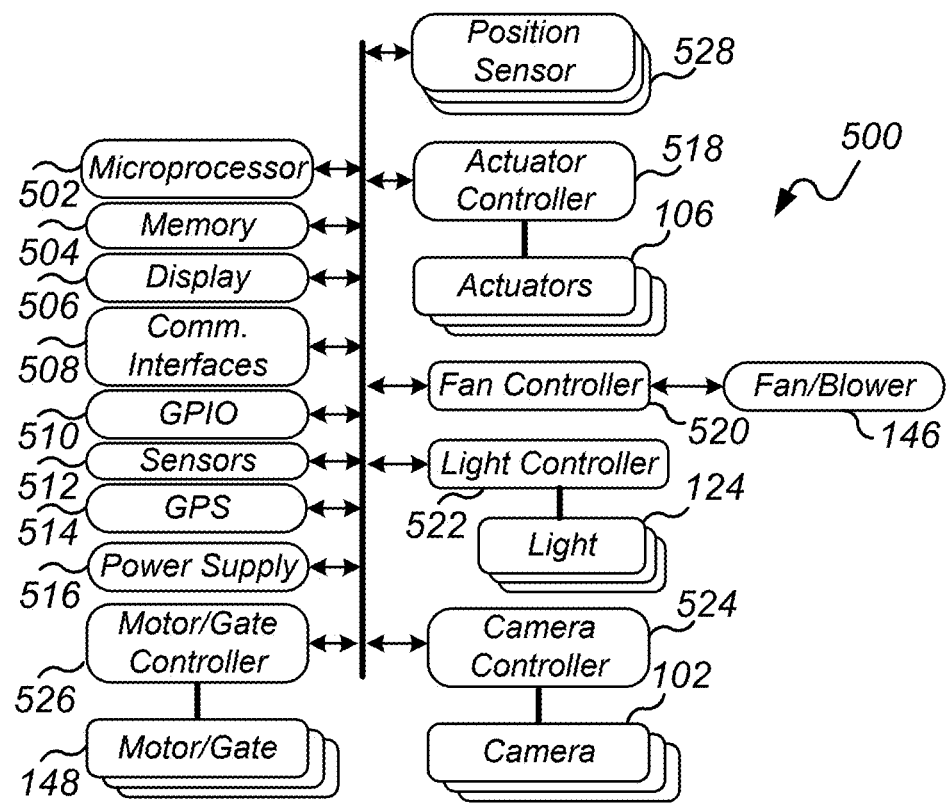

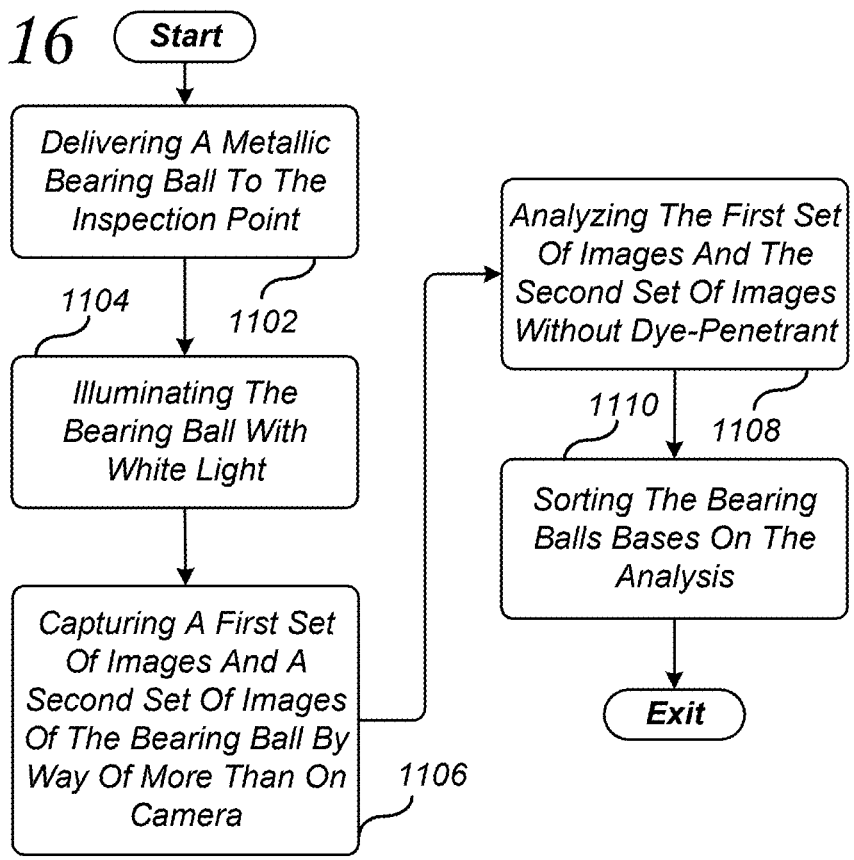
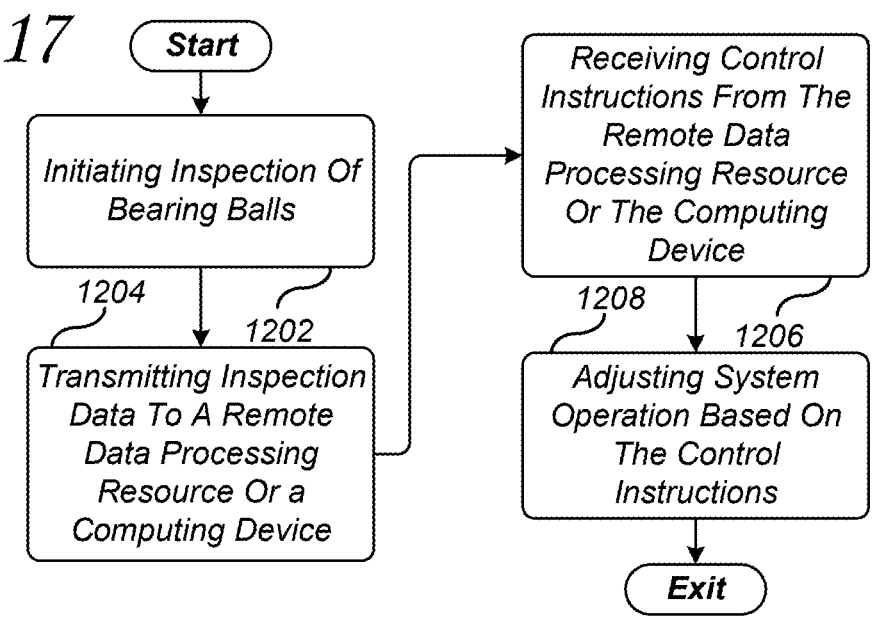

BEARING BALL INSPECTION SYSTEM

CROSS-REFERENCE TO RELATED APPLICATIONS

This application contains subject matter which is related to the subject matter of the following application. The below-listed application is hereby incorporated herein by reference in its entirety:

This is a U.S. non-provisional application that claims the benefit of a U.S. provisional application, Ser. No. 63/661,918, inventor Lance Edelman et al., entitled "BALL-BEARING INSPECTION DEVICE AND METHOD", filed Jun. 20, 2024.

TECHNICAL FIELD OF THE INVENTION

This invention relates to automated non-destructive testing systems for surface inspection of spherical components, and particularly to bearing ball inspection systems configured to deliver, rotate, illuminate, image, analyze, and sort bearing balls based on surface defect detection using machine learning models and controlled illumination environments.

BACKGROUND OF THE INVENTION

Before our invention, bearing ball inspection processes relied on a variety of manual and semi-automated techniques that presented numerous limitations in terms of reliability, efficiency, and scalability. In prior approaches, surface inspection of bearing balls frequently depended on human visual examination under ultraviolet or white-light illumination, a method that introduced subjectivity, inconsistency, and operator fatigue into the inspection results. Defect detection accuracy varied significantly across different operators and shifts, leading to inconsistent quality control outcomes.

Additionally, prior approaches often lacked comprehensive surface coverage of bearing balls during inspection. With limited imaging angles or static illumination setups, many systems were unable to adequately expose or capture defects located on less accessible regions of the bearing ball surface. This incomplete coverage increased the risk of undetected defects entering downstream applications where bearing ball integrity is critical.

Another significant shortcoming of prior approaches was the lack of effective sorting mechanisms integrated into the inspection process. In many cases, defective bearing balls were marked manually or removed in secondary steps, introducing the potential for handling errors, increased processing time, and cross-contamination between inspected and non-inspected items.

Thermal management and system stability also posed challenges for prior inspection systems. Without active cooling or well-organized internal layouts, many systems experienced temperature-related drift in imaging components, leading to degraded inspection precision over extended periods of operation.

Furthermore, prior approaches typically lacked remote communication capabilities or centralized data management. Inspection results were often recorded manually or stored locally, limiting the ability to perform real-time monitoring, remote diagnostics, or fleet management across distributed production facilities. This absence of networked capability hampered quality assurance efforts, delayed corrective actions, and made compliance verification more labor-intensive.

The present invention addresses these and other shortcomings by providing a bearing ball inspection system configured to automate imaging, analysis, and defect sorting while supporting reliable, scalable, and remotely managed inspection operations. For these reasons and shortcomings as well as other reasons and shortcomings, there is a long-felt need that gives rise to the present invention.

SUMMARY OF THE INVENTION

The shortcomings of prior approaches are overcome, and additional advantages are provided through the provision of a bearing ball inspection system configured to automate surface defect detection through multi-angle imaging and machine learning. The system comprises a rail guide that delivers a bearing ball to an inspection point, where a positioning wheel supports and rotates the ball to expose different surface areas for inspection. A light source illuminates the bearing ball, and a plurality of cameras are arranged around the inspection point to capture a first set of images before rotation and a second set of images after repositioning. A control system including a microprocessor, memory, and communication interface operates in conjunction with a machine learning model to analyze the image data and detect surface defects. The analysis can be performed locally by the control system or remotely via the communication interface. Based on the analysis outcome, a sorting mechanism automatically directs the bearing ball to a fail egress or pass egress, enabling high-throughput, consistent, and operator-independent quality control. infrastructure Additional shortcomings of prior approaches are overcome, and additional advantages are provided through the provision of a bearing ball inspection system configured to detect surface defects on metallic bearing balls without the use of dye-penetrant. The system includes a rail guide for delivering a bearing ball to an inspection point and a positioning wheel for rotating the ball to expose different surface regions during inspection. A light source illuminates the bearing ball, and a plurality of cameras are configured to capture a first set of images and a second set of images from different orientations. A control system comprising a microprocessor, memory, and communication interface is operatively coupled to a machine learning model trained to analyze the image data and detect surface defects. The analysis may be performed locally by the control system or remotely by a connected computing device or remote data processing resource via the communication interface. Based on the analysis results, a sorting mechanism directs the bearing ball to either a pass location or a fail location, enabling high-throughput inspection of reflective or metallic components without chemical preparation steps.

Additional shortcomings of prior approaches are overcome, and additional advantages are provided through the provision of a bearing ball inspection system configured for real-time remote monitoring, parameter control, and intelligent surface defect detection. The system includes a rail guide that delivers a bearing ball to an inspection point, where a positioning wheel rotates the ball to expose multiple surface regions. A light source illuminates the bearing ball, and a plurality of cameras capture a first set of images and a second set of images for analysis. A control system comprising a microprocessor, memory, and a communication interface coordinates system operations. The communication interface is configured to transmit inspection results and operational status to a remote computing device, and to receive control instructions for adjusting inspection parameters or initiating inspection cycles. A machine learning model analyzes the image data to detect surface defects, with the analysis performed locally or remotely via the communication interface. A sorting mechanism classifies each bearing ball based on the results of the analysis, enabling flexible integration with distributed quality assurance infrastructure and remote supervisory control.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 10 illustrates one example of a control system block diagram;

FIGS. 15-17 illustrate examples of methods of using the bearing ball inspection system.

Figure 1:
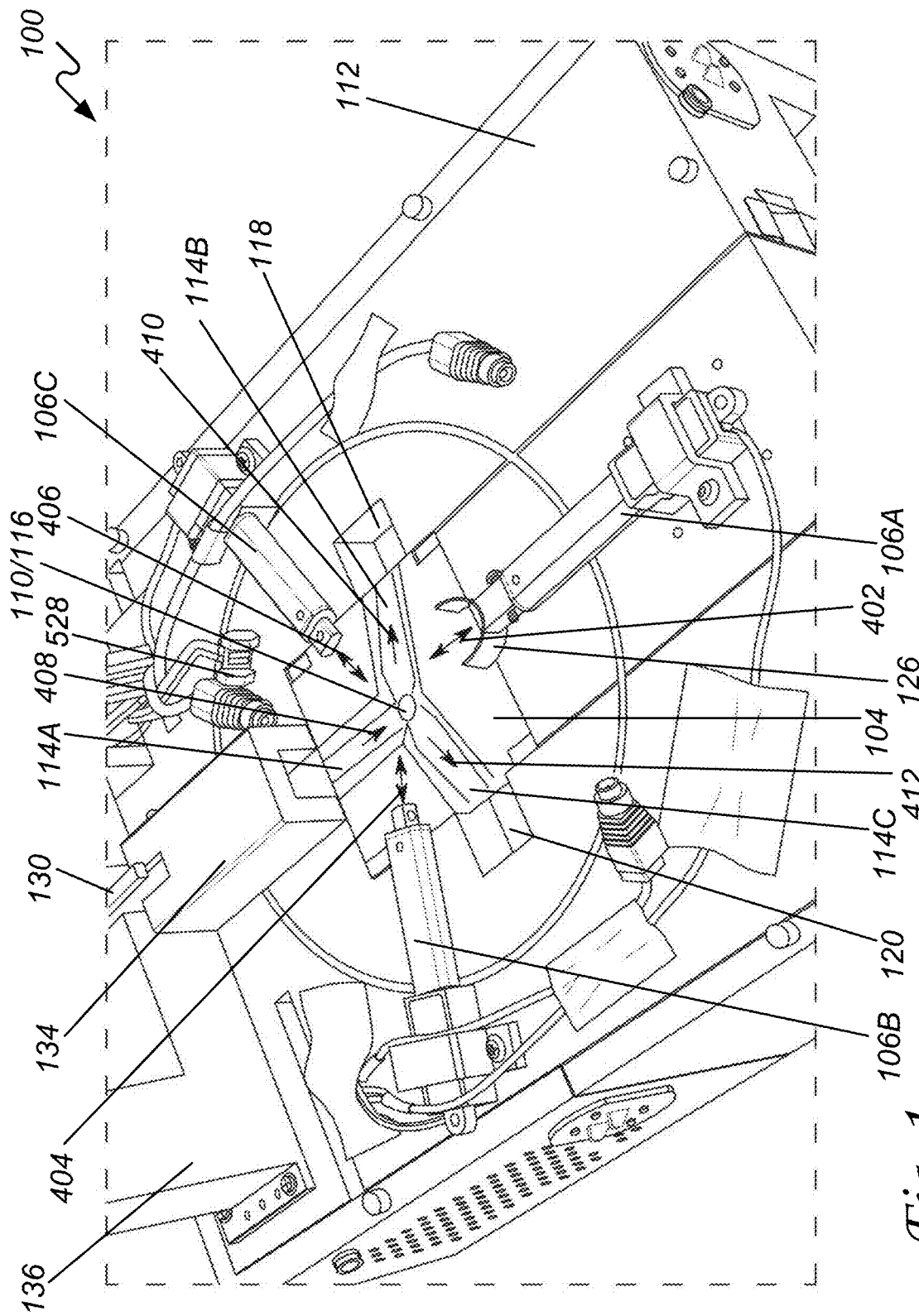
FIGS. 1-2 illustrates one example of a bearing ball inspection system with the inspection area cover removed.

The detailed description explains the preferred embodiments of the invention, together with advantages and features, by way of example with reference to the drawings.

DETAILED DESCRIPTION OF THE INVENTION

Non-destructive testing (NDT) plays a critical role in ensuring the quality and reliability of bearing balls used in demanding industries such as aerospace, automotive, and industrial machinery. Traditional inspection methods for bearing balls, particularly non-metallic types like silicon nitride or ceramic, typically involve the application of a dye penetrant followed by manual inspection under ultraviolet light. This manual process is labor-intensive, subjective, and prone to errors such as false positives and false negatives. Moreover, for metallic bearing balls, conventional inspection systems often rely on visual inspection or eddy current testing, both of which have limitations in sensitivity, cost, and scalability.

The present invention addresses these and other shortcomings by providing a fully automated bearing ball inspection system that integrates mechanical handling, controlled illumination, multi-angle imaging, and machine learning-based defect detection. The system is configured to inspect non-metallic bearing balls using ultraviolet light following dye penetrant application and is further adaptable for inspecting metallic bearing balls under white-light illumination without the need for dye penetrant. Through the use of a positioning wheel, multiple cameras, a light source assembly, and an actuator-controlled rail guide, the system achieves complete surface imaging coverage. Captured images are processed by a machine learning model trained to identify surface defects with high accuracy.

In addition to automated defect detection and sorting, the system includes a communication interface that enables remote monitoring and operational control through smartphones, tablets, laptops, or other computing devices. Inspection results, system status, and operational metrics can be transmitted over a network to a remote user, who may also issue control instructions to adjust inspection parameters or initiate inspection cycles. This connectivity enhances flexibility, improves inspection reliability, and supports integration into modern smart manufacturing environments.

The invention represents a significant advancement over conventional inspection techniques by reducing reliance on human interpretation, improving inspection throughput, enhancing defect detection accuracy, and providing remote access to operational controls and inspection data. These improvements allow manufacturers to better ensure the integrity of bearing balls used in critical applications while achieving efficiencies in quality control operations.

In the present invention, the term "bearing ball" is intended to mean a spherical rolling element used in ball bearings or similar mechanical assemblies, and may be composed of metallic, ceramic, or composite materials. The term does not include the bearing assembly itself.

In the present invention, the term "inspection point" is intended to mean the physical location within the system where the bearing ball is positioned and held for imaging during an inspection cycle.

In the present invention, the term "inspection results" is intended to mean data associated with the inspection of a bearing ball, which can include either raw image data and sensor readings captured at the device level prior to analysis, or processed output data such as defect classifications, pass/fail determinations, and surface condition metrics generated by a computing device, control system, or remote data processing resource.

In the present invention, the terms "first set of images" and "second set of images" are intended to refer to groups of image data captured of the same bearing ball at different orientations or surface exposures during an inspection cycle.

In the present invention, the term "machine learning model" is intended to mean a computational algorithm trained on labeled datasets of bearing ball images to classify or detect surface defects based on extracted features from those images.

In the present invention, the terms "fail egress" and "pass egress" are intended to mean discrete physical output paths that direct bearing balls based on inspection results. A fail egress corresponds to a defect classification, while a pass egress corresponds to an acceptable classification.

In the present invention, the term "communication interface" is intended to mean one or more hardware and/or software components configured to transmit and receive data between the bearing ball inspection system and external computing devices or remote data processing resources via wired or wireless communication protocols.

Turning now to the drawings in greater detail, it will be seen that in FIG. 1 there is illustrated one example of a bearing ball inspection system 100 with the inspection area cover 108 removed to reveal internal components and system layout. In an exemplary embodiment, the bearing ball inspection system 100 is designed to automate the inspection of bearing balls 202, ensuring accurate detection of surface defects while maintaining high throughput and repeatability.

The system 100 includes a rail guide 104 configured to deliver a bearing ball 202 to an inspection point 116. The rail guide 104 can include several interconnected elements, beginning with a funnel inlet 128, which is configured to receive a plurality of the bearing balls 202 from a supply source. The funnel inlet 128 directs each of the bearing balls 202 toward an inlet gate 130. The inlet gate 130 is actuated by an inlet actuator 132, which can be a solenoid, a motor, or another suitable actuator. Upon activation, the inlet actuator 132 moves the inlet gate 130 to release one of the bearing balls 202 at a time into the system, ensuring controlled and continuous feeding.

In an exemplary embodiment, the inlet gate 130 does not operate by opening and closing in a hinged or linear fashion, but instead rotates about an axis to perform a sweeping motion. A bearing ball 202 staged adjacent to the inlet gate 130 rests in a defined holding position near the funnel inlet 128. When actuated by the inlet actuator 132, the inlet gate 130 rotates in a controlled arc to contact and sweep a single bearing ball 202 forward along the rail guide 104 toward the inspection point 116. The geometry of the sweep ensures that only one bearing ball is released per actuation cycle, supporting continuous and controlled system operation.

To support this process, a first position sensor 528 can be configured to detect the presence of a bearing ball 202 at the staging position 150 proximate to the inlet gate 130. This sensor provides confirmation to the control system 500 that a bearing ball is ready to be swept forward. A second position sensor 528 can be configured to detect the rotational position of the inlet gate 130 itself, verifying that the gate is in the correct initial position prior to actuation and has returned to its reset position following the sweep. Together, these sensors ensure precise synchronization between ball delivery, gate motion, and inspection readiness, enhancing reliability and throughput in high-speed inspection environments.

Downstream of the inlet gate 130, a ball aligner 126 is provided. The ball aligner 126 is operatively coupled to an actuator 106A and is configured to precisely intercept and guide the released bearing ball 202 onto a positioning wheel 110 located at the inspection point 116. The ball aligner 126 improves the accuracy of ball positioning by stopping unwanted rolling and helping place each bearing ball 202 directly onto the correct position on the positioning wheel 110, minimizing the risk of misalignment or bouncing that could interrupt the inspection process.

The positioning wheel 110 is located at the center of the inspection point 116. The positioning wheel 110 can be rotated by a motor that is controlled by the system's control system 500. During inspection, the bearing ball 202 can rest upon the positioning wheel 110, which can rotate the bearing ball 202 to expose multiple surface regions for imaging. This rotational repositioning is advantageous because it allows full circumferential inspection of the bearing ball 202 without requiring complex multi-axis robotic movement.

In an exemplary embodiment, at least one position sensor 528 can be mounted in proximity to the inspection point 116 and configured to detect the presence of a bearing ball 202. The position sensor 528 can provide real-time feedback to the control system 500, confirming that a bearing ball 202 is properly seated on the positioning wheel 110 before image capture begins. This sensing capability helps coordinate the activation of the light sources 124 and cameras 102, ensuring that image acquisition is triggered only when the bearing ball is in the correct position. The integration of position sensor 528 enhances inspection reliability by preventing false image captures or misaligned imaging sequences in the event of an improperly loaded or absent bearing ball.

Surrounding the inspection point 116, a plurality of cameras 102 are strategically positioned. In the illustrated embodiment, the cameras 102 can include a top-down camera and three side-mounted cameras oriented at an angle, such as a tilt angle of approximately 60 degrees relative to vertical. The positioning and orientation of the cameras 102 allow the system 100 to capture a first set of images of a first surface of the bearing ball 202 from multiple perspectives simultaneously, thereby enhancing defect detection sensitivity compared to single-camera or single-perspective systems of prior approaches.

Complementing the camera system, a set of light sources 124 is also positioned around the inspection point 116. The light sources 124 can include three or more ultraviolet (UV) emitters, white light emitters, or other suitable light sources as required, spaced approximately 120 degrees apart around the bearing ball 202, providing even and thorough illumination during UV-based inspections. Alternatively, for metallic bearing balls that do not use dye penetrant, the light sources 124 can comprise white-light sources to facilitate visual inspection under standard illumination conditions.

After the first set of images is captured, the actuator 106A and positioning wheel 110 cooperate to reposition the bearing ball 202, exposing additional surface areas. The plurality of cameras 102 can then capture a second set of images from the newly exposed regions. By combining the first and second sets of images, the inspection system 100 ensures near-complete surface coverage of the bearing ball 202, reducing the likelihood of missing defects that could otherwise be hidden from a single imaging angle.

The captured images are processed by the control system 500, which includes a microprocessor and memory for local data processing and storage. The control system 500 executes a machine learning model trained to analyze the first and second sets of images and detect the presence of surface defects, such as cracks, pits, or material inconsistencies, on the bearing ball 202.

Following the analysis, the system's sorting mechanism is activated. The sorting mechanism comprises actuator 106B, configured to eject a bearing ball 202 into a fail egress 118 if a defect is detected by the machine learning model, and actuator 106C, configured to eject the bearing ball 202 into a pass egress 120 if no defect is detected. In this manner, the system 100 automatically separates defective bearing balls from acceptable ones without human intervention.

The overall structure is housed within an enclosure 112, which supports and protects the internal components. A fan 146 can be mounted inside or adjacent to the enclosure 112 and is configured to remove heat generated during operation, thereby maintaining optimal operating temperatures for electronic components and extending system lifespan.

The bearing ball inspection system 100 provides numerous advantages over prior approaches. Traditional methods often required manual visual inspection under ultraviolet light, relying heavily on human operators whose evaluations could vary based on fatigue, training, or subjective interpretation. In contrast, the present system delivers objective, machine-learning-based defect evaluation with consistent criteria. Furthermore, prior approaches often lacked complete surface coverage or required manual repositioning of the bearing ball, introducing inspection gaps or damage risks. The present system's use of a positioning wheel 110 and multi-camera setup eliminates these limitations, allowing faster and more complete inspections.

The integration of automated ball delivery, repositioning, imaging, analysis, and sorting into a single unified system reduces operational errors, increases throughput, and supports integration into automated manufacturing lines. Additionally, because of the modular nature of components such as the cameras 102, light sources 124, and actuators 106A-106C, the system 100 can be easily scaled or adapted for bearing balls of various sizes or material types, further enhancing its flexibility compared to rigid, single-purpose inspection setups previously available.

Figure 2:
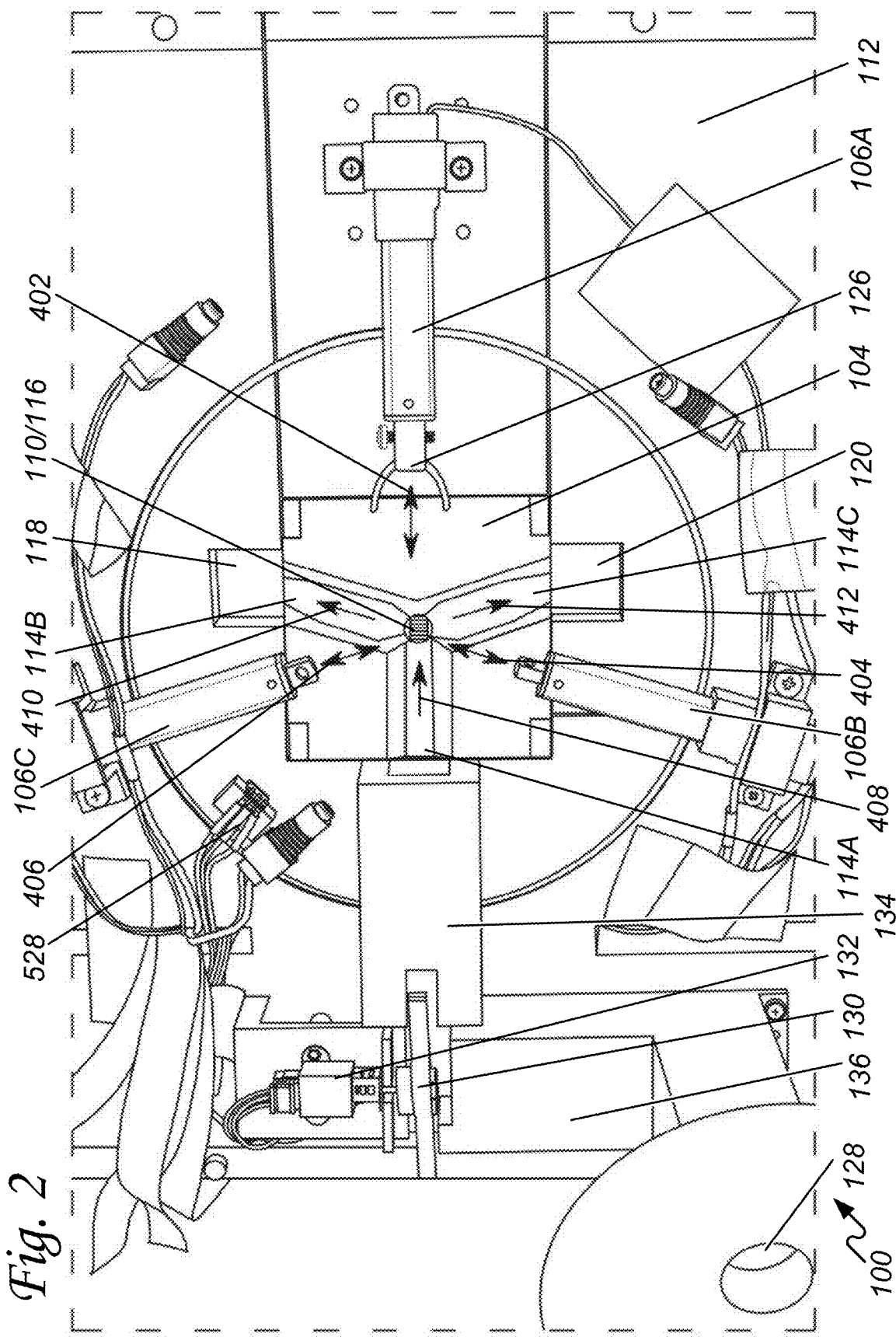

Referring to FIG. 2, there is illustrated another example of a bearing ball inspection system 100 with the inspection area cover 108 removed to show the arrangement of various system components from a different perspective. In an exemplary embodiment, FIG. 2 provides a clearer view of the interrelation between the rail guide 104, tracks 114A, 114B, and 114C, and the functional pathways directing the bearing ball 202 through the inspection system.

This exemplary configuration demonstrates how the present invention supports not only defect detection accuracy but also operational efficiency, adaptability to different inspection modes, and system robustness, addressing limitations seen in earlier manual or semi-automated inspection solutions.

The funnel inlet 128 can be seen positioned above the inlet gate 130, both cooperating to regulate the sequential delivery of individual bearing balls 202 into the system. The inlet gate 130 is operatively connected to the inlet actuator 132, which is configured to selectively open and close the gate to release one bearing ball 202 at a time along the track 114A toward the inspection point 116. The spatial alignment between the funnel inlet 128, inlet gate 130, and the beginning of the track 114A can be better appreciated in this view, highlighting the continuous and controlled delivery of bearing balls 202 without manual handling.

The positioning of the ball aligner 126 and its associated actuator 106A is also visible. As a bearing ball 202 exits the track 114A and approaches the inspection point 116, the ball aligner 126 can extend into the path of travel to intercept and correctly position the bearing ball 202 onto the positioning wheel 110. In this exemplary embodiment, the positioning wheel 110 remains centrally located relative to the inspection area and is configured to support and rotate the bearing ball 202 during imaging operations.

A plurality of cameras 102 are positioned around the inspection point 116 at strategic angles to optimize surface coverage. In this view, the placement of the cameras 102 relative to the bearing ball 202 is more apparent, demonstrating how multiple angles are utilized to capture comprehensive image sets. Similarly, the light sources 124 are arranged around the inspection point 116 to uniformly illuminate the surface of the bearing ball 202 during inspection, whether using ultraviolet light for dye-penetrant inspections or white-light for metallic bearing ball inspections.

Downstream of the inspection point 116, actuator 106B is configured adjacent to track 114B, which leads to the fail egress 118, and actuator 106C is positioned near track 114C, leading to the pass egress 120. In this configuration, once the bearing ball 202 has been inspected and classified by the control system 500 executing the machine learning model, it can be automatically sorted into the appropriate pathway without manual intervention.

Enclosure 112 can be seen structurally supporting the system's components. Within or adjacent to the enclosure 112, the fan 146 is positioned to provide thermal management for the control system 500 and associated electronics, ensuring operational stability during continuous use. Unlike prior approaches that often lacked effective cooling, resulting in system performance degradation, the integration of active cooling in the present invention enhances reliability over extended inspection cycles.

In an exemplary embodiment, the spatial efficiency demonstrated in FIG. 2 allows the system 100 to maintain a compact footprint, making it well-suited for integration into production environments where space and accessibility are critical. The arrangement of the rail guide 104, tracks 114A, 114B, and 114C, and actuators 106A-106C facilitates smooth material flow through the system without bottlenecks. Prior approaches often required complex mechanical handling systems or manual intervention between inspection and sorting stages, leading to delays and potential handling errors. In contrast, the bearing ball inspection system 100 provides a continuous, automated workflow from input to inspection to sorting, enhancing productivity and reducing labor costs.

Figure 3:
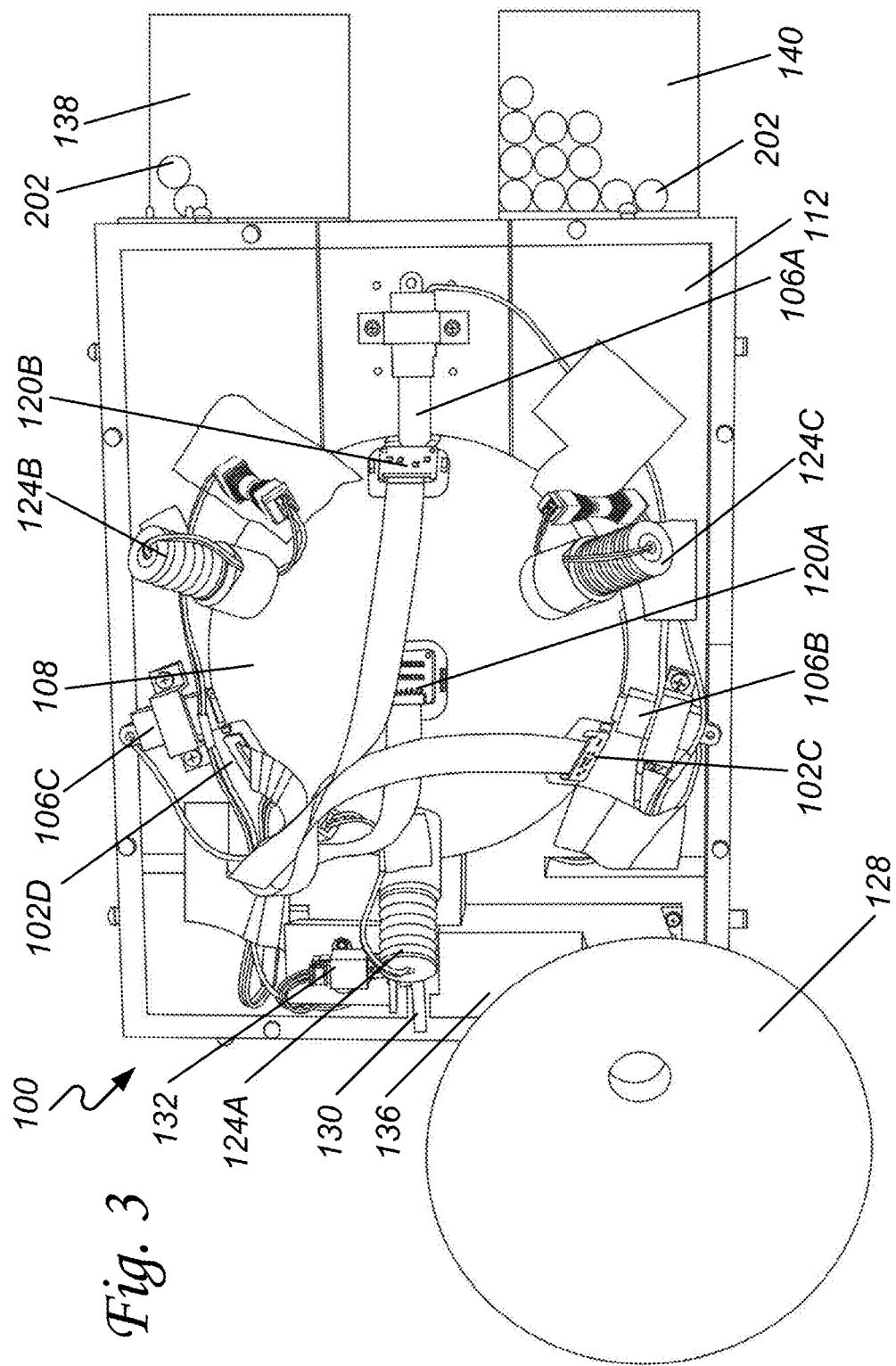
FIGS. 3-6 illustrates one example of a bearing ball inspection system with the inspection area cover.

Referring to FIG. 3, there is illustrated one example of a bearing ball inspection system 100 with the inspection area cover 108 installed. In an exemplary embodiment, the inspection area cover 108 is mounted over the critical inspection region, enclosing the positioning wheel 110, the bearing ball 202 during inspection, and the surrounding cameras 102 and light sources 124. The cover 108 can be dome-shaped, although other suitable geometries can also be used depending on specific inspection requirements.

The modular configuration illustrated in FIG. 3, with a clear division between the inspection environment (protected by the cover 108) and the system control components (housed within the enclosure 112), promotes system robustness, serviceability, and adaptability for different operating environments or bearing ball sizes.

The enclosure 112 is configured to support the inspection area cover 108 and the underlying inspection system components. The enclosure 112 can house the control system 500, including the microprocessor, memory, and associated actuators 106A, 106B, and 106C. By enclosing sensitive optical, mechanical, and electronic components, the enclosure 112 protects the system from environmental contaminants such as dust, debris, or stray light, which could otherwise impair the accuracy of image capture and defect analysis.

The inspection area cover 108 itself can be formed from a durable and optically compatible material, which can be selected to block ambient light while allowing internal ultraviolet or white-light illumination to operate effectively. In this exemplary embodiment, the cover 108 enhances image consistency by isolating the inspection point 116 from variable external lighting conditions, thereby improving the performance of the machine learning model executed by the control system 500.

The funnel inlet 128 is positioned above the inspection area and remains partially visible above the inspection area cover 108. The funnel inlet 128 is configured to guide a plurality of bearing balls 202 into the system one at a time through the controlled operation of the inlet gate 130 and inlet actuator 132, as previously described. Although the primary pathway and motion of the bearing balls 202 into the inspection zone are covered in FIG. 1 and FIG. 2, FIG. 3 provides a clear understanding of how the funnel inlet 128 is integrated into the upper region of the system architecture.

The outer surface of the inspection area cover 108 and can be seen to interface smoothly with the top portion of the enclosure 112. The design can incorporate sealing interfaces or removable latch mechanisms, which enable the inspection area cover 108 to be easily removed or secured during system maintenance or bearing ball replacement.

A top cover latch 142 can be provided to secure the top cover 144 in place relative to the enclosure 112. This construction ensures that during normal operation, the top cover 144 remains firmly positioned to maintain consistent inspection conditions, while still allowing efficient access when needed.

In an exemplary embodiment, enclosing the inspection zone using the inspection area cover 108 provides several advantages compared to prior approaches. Prior bearing ball inspection systems often lacked controlled environmental enclosures, resulting in inconsistencies in illumination and image quality caused by external light contamination. In contrast, the present system shields the bearing ball 202 from ambient light variability, enhancing the repeatability of image capture and improving the reliability of defect detection. Furthermore, the ability to quickly remove and reinstall the inspection area cover 108 without disturbing the alignment of the internal cameras 102 and light sources 124 simplifies maintenance and reduces system downtime, a notable improvement over designs where disassembly was more intrusive.

Figure 4:
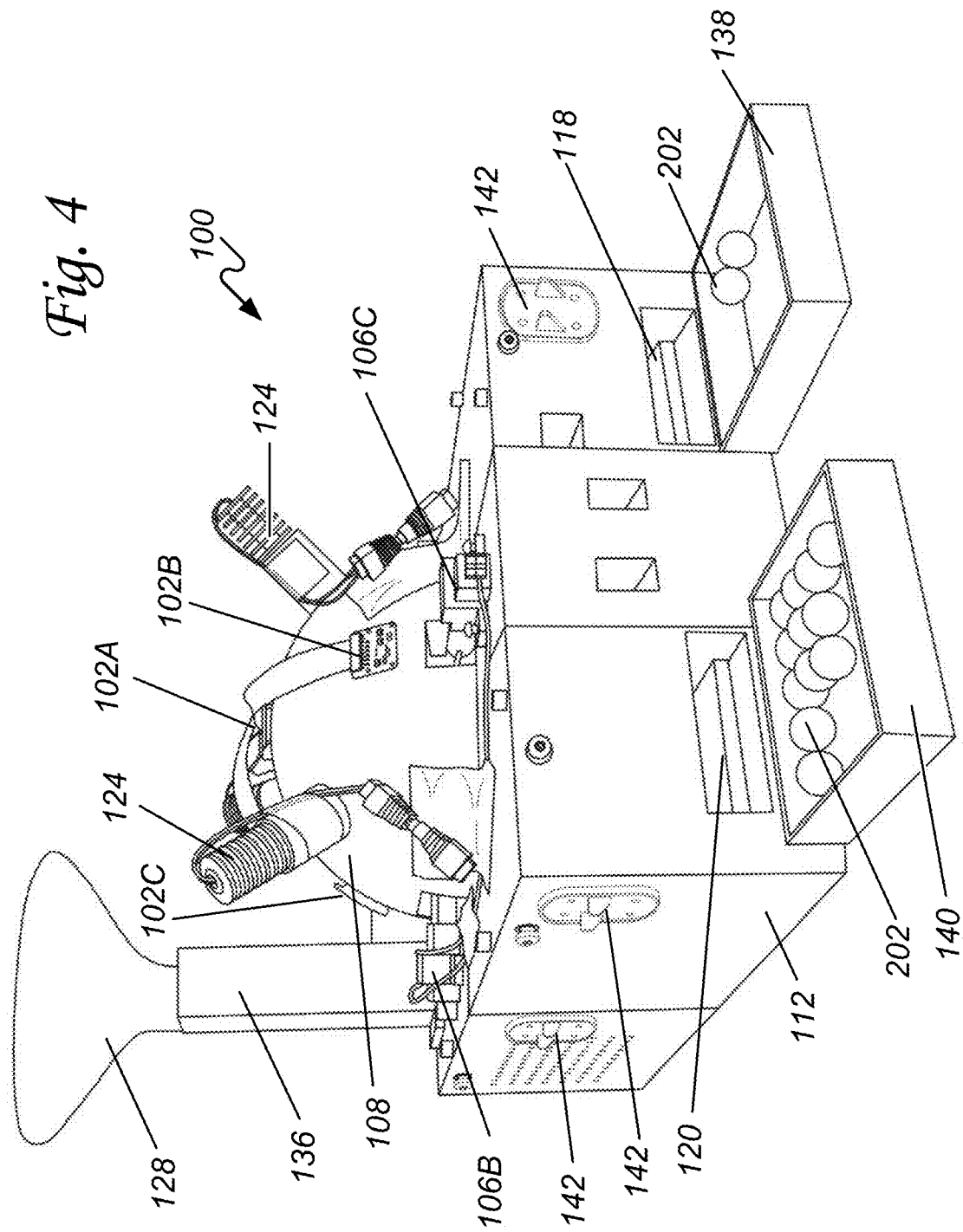

Referring to FIG. 4, there is illustrated another view of the bearing ball inspection system 100, specifically highlighting the system from a top-down perspective with the inspection area cover 108 installed. In an exemplary embodiment, FIG. 4 provides a clearer view of how the inspection area cover 108 encapsulates the critical inspection components, including the positioning wheel 110, the bearing ball 202, the cameras 102, and the light sources 124.

The top view illustrates how the bearing ball inspection system 100 achieves a compact and efficient layout, supporting high-throughput inspection lines without occupying excessive floor space, an important consideration for modern manufacturing environments.

The inspection area cover 108 can be seen fully enclosing the inspection point 116, forming a protective barrier that isolates the imaging environment from ambient light and airborne contaminants. From this overhead perspective, the symmetric arrangement of the cameras 102 and light sources 124 relative to the bearing ball 202 becomes more apparent. Cameras 102 can be distributed circumferentially around the inspection point 116, with one camera oriented vertically above the positioning wheel 110, and multiple side cameras oriented at defined tilt angles. This arrangement ensures that both the top surface and the peripheral regions of the bearing ball 202 can be imaged simultaneously, increasing inspection coverage and reducing imaging cycle time.

Similarly, the light sources 124 are arranged around the bearing ball 202 to provide uniform illumination during inspection. In one exemplary embodiment, three ultraviolet (UV) light sources 124 can be positioned at approximately 120-degree intervals around the bearing ball 202 to evenly illuminate surface discontinuities made visible by the dye penetrant. Alternatively, for metallic bearing balls inspected without dye penetrant, the light sources 124 can comprise white-light emitters providing high-contrast illumination under visible light conditions.

From the top view, the integration of the funnel inlet 128 into the upper portion of the system 100 can also be appreciated. The funnel inlet 128 is aligned to direct a plurality of bearing balls 202 toward the inlet gate 130, regulated by the inlet actuator 132. This configuration supports continuous feeding of bearing balls 202 into the inspection system without manual intervention. The top surface of the enclosure 112 provides structural support for both the funnel inlet 128 and the inspection area cover 108, ensuring rigidity and minimizing vibration that could affect imaging quality.

In an exemplary embodiment, the top-down layout illustrated in FIG. 4 highlights an important advantage of the present invention compared to prior approaches. Prior bearing ball inspection systems often suffered from non-uniform illumination and incomplete imaging coverage due to suboptimal placement of light sources and cameras. In contrast, the present invention provides a highly symmetric, precisely aligned inspection geometry that enhances defect visibility and reduces imaging artifacts. The modular design of the inspection area cover 108, combined with the standardized placement of cameras 102 and light sources 124, facilitates calibration, maintenance, and scalability, enabling the system to adapt to different bearing ball sizes or inspection protocols with minimal reconfiguration.

Additionally, the enclosed, shielded inspection environment provided by the inspection area cover 108 helps maintain a consistent imaging background, enhancing the performance of the machine learning model executed by the control system 500. This isolation from external lighting variability represents a significant improvement over prior inspection setups, where fluctuating ambient conditions often degraded inspection consistency and reliability.

Figure 5:
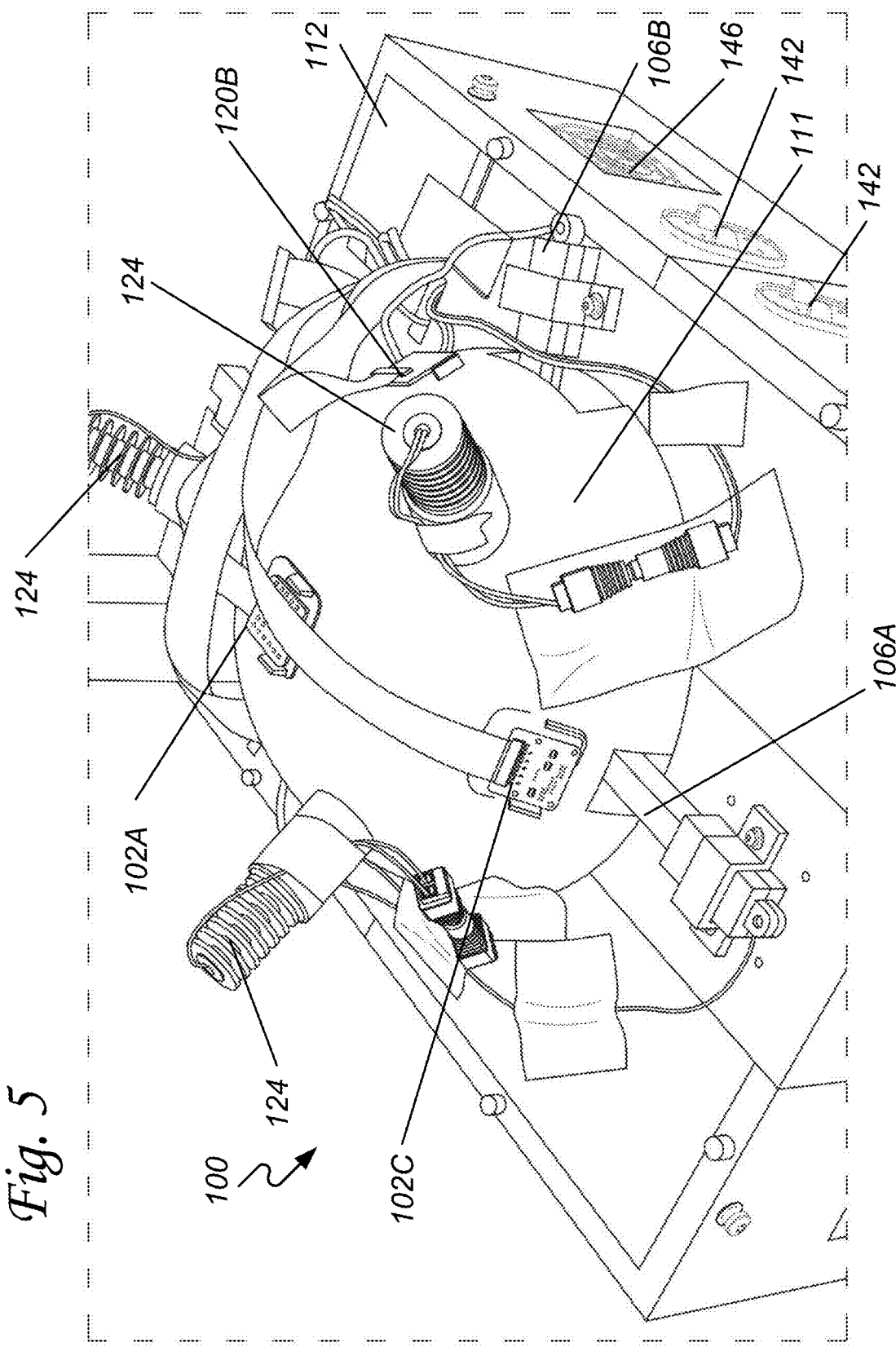

Referring to FIG. 5, there is illustrated a side view of the bearing ball inspection system 100 with the inspection area cover 108 in place. In an exemplary embodiment, this view provides greater clarity regarding the structural interface between the inspection area cover 108 and the enclosure 112, as well as the accessibility and maintenance features designed into the system.

The inspection area cover 108 is shown seated over the upper portion of the enclosure 112, fully enclosing the inspection point and shielding the bearing ball 202, positioning wheel 110, and surrounding cameras 102 and light sources 124. From this angle, the contour of the cover 108 is more apparent, and it can be seen to follow a dome-like profile that enhances both optical uniformity and structural rigidity. The sloped design allows internal light to be contained and reflected uniformly across the ball surface, minimizing shadows or illumination loss that could interfere with defect detection.

The system includes a top cover 144 that is configured to extend over the inspection area cover 108. The top cover 144 can function as an additional protective barrier against environmental contaminants or impact during handling or transport. The top cover 144 is shown secured using one or more top cover latches 142, which are positioned to engage with the enclosure 112 or other fixed mounting points on the system. The latch mechanism allows the top cover 144 to be installed or removed quickly, enabling operators to access internal components for cleaning, calibration, or maintenance without disassembling the entire system.

From this side view, the form factor of the enclosure 112 is also more evident. The enclosure provides structural support for the inspection region while housing sensitive components of the control system 500, including the microprocessor, memory, actuator controllers, and power supply. The enclosure 112 can be fabricated from rigid, durable materials that provide electromagnetic shielding, mechanical protection, and vibration-damping.

The position wheel actuator 148 may also be partially visible in this view, as it is responsible for driving the rotation of the positioning wheel 110 during inspection. By rotating the bearing ball 202 during the imaging sequence, the system ensures that both hemispheres of the bearing ball 202 are exposed to the cameras 102 and light sources 124 for comprehensive surface analysis.

In an exemplary embodiment, the use of a hinged or removable top cover 144 secured by quick-release latches 142 offers several practical advantages. Unlike prior approaches, which often required specialized tools or full system disassembly to access internal imaging components, the present system allows quick access for inspection, cleaning, or replacement of individual parts. This modular accessibility significantly reduces maintenance time and minimizes system downtime in high-throughput production environments.

Additionally, the secure enclosure of both the inspection area and the underlying control components contributes to enhanced system robustness. By physically separating the user-accessible top cover 144 and latch mechanisms 142 from the sensitive optics and electronics within, the system reduces the risk of accidental misalignment or damage during servicing.

Figure 6:
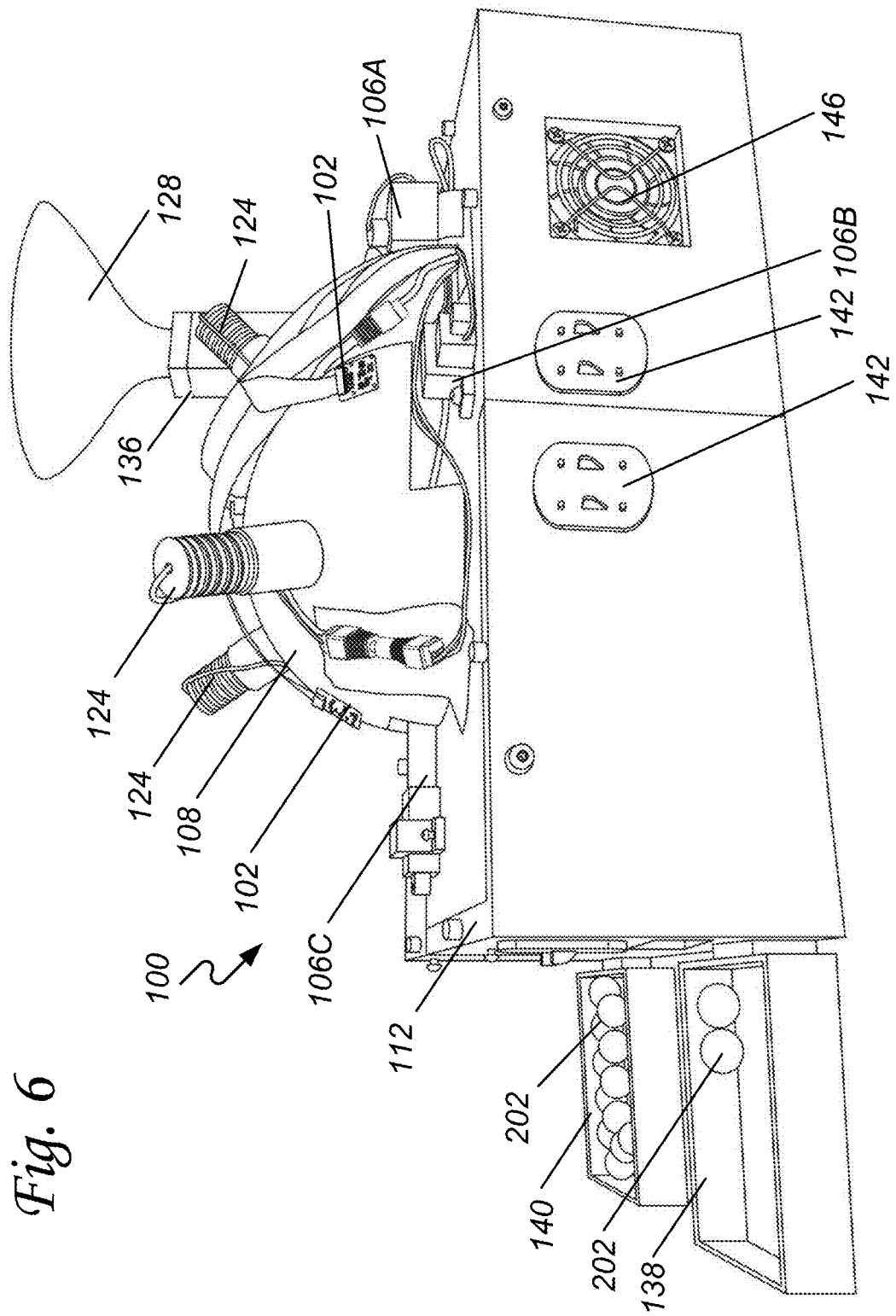

Referring to FIG. 6, there is illustrated a rear view of the bearing ball inspection system 100, showing additional structural and functional components related to system cooling, power management, and external communication. In an exemplary embodiment, FIG. 6 provides insight into how the system's design supports reliable operation over extended inspection cycles, even in demanding production environments.

Prominently visible is a fan 146 mounted along the rear surface of the enclosure 112. The fan 146 is configured to manage airflow across internal components of the control system 500, which includes the microprocessor, memory, actuator controllers, power supply, and communication interface. Active airflow provided by the fan 146 can help maintain optimal operating temperatures for the control system 500, preventing thermal buildup that could otherwise impair performance or shorten component lifespan. In one exemplary embodiment, the fan 146 can be controlled dynamically based on internal temperature readings captured by sensors 512, allowing for energy-efficient and responsive cooling operation.

The enclosure 112 shown in FIG. 6 is designed to accommodate not only thermal management but also convenient access to power and communication connections. Power supply inputs, such as those associated with the power supply 516, can be located along the rear panel, allowing the system to be easily integrated into existing manufacturing or laboratory infrastructure. Similarly, the communication interface 508 of the control system 500 can provide network ports or wireless modules positioned near the rear access area. This facilitates connection to local area networks or to remote computing devices for monitoring inspection results, transmitting operational status, and receiving updated control instructions.

In an exemplary embodiment, the positioning of critical input/output elements along the rear surface of the enclosure 112 offers practical benefits compared to prior approaches. Previous systems often required side or top access for cabling and maintenance, which could complicate system placement or expose internal components to contamination. By consolidating external access points to the rear of the system 100, the present invention improves system cleanliness, simplifies installation against production line barriers, and enhances cable management.

The compact integration of the control system 500 into the lower portion of the enclosure 112, thermally managed by the fan 146, also improves serviceability. Technicians can easily access the control electronics for diagnostic checks, firmware updates, or repairs without disturbing the mechanical alignment of the inspection zone above, preserving system calibration and reducing downtime.

Furthermore, by including active cooling and structured rear access, the bearing ball inspection system 100 is well-suited for continuous operation in high-throughput environments where reliability, uptime, and system health monitoring are critical. These capabilities address long-standing challenges seen in prior approaches, where passive cooling alone was insufficient for sustained precision imaging operations, and where disorganized cabling and scattered interfaces complicated system integration.

Figure 7:
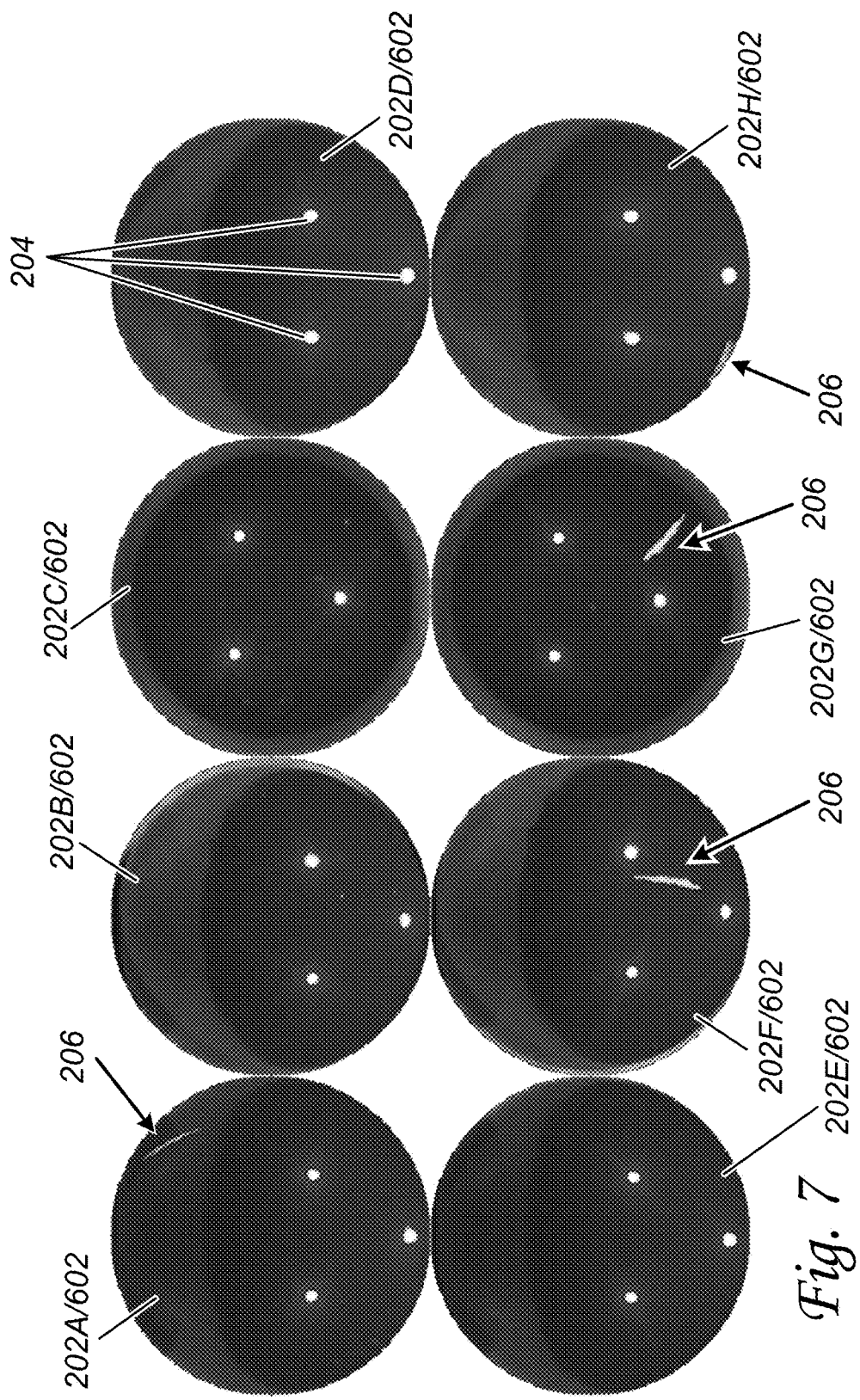
FIG. 7 illustrates one example of a plurality of bearing ball inspection images.

Referring to FIG. 7, there is illustrated one example of a plurality of bearing ball inspection images captured by the bearing ball inspection system 100. In an exemplary embodiment, FIG. 7 presents visual output from the system's multi-camera imaging sequence, showing multiple bearing balls 202A-202H as they appear during automated inspection under controlled illumination.

Each bearing ball 202A through 202H can be seen with characteristic three-dot light reflections 204, produced by the strategically placed light sources 124 around the inspection point 116. These reflection patterns assist in verifying consistent illumination angles and surface exposure during imaging. The uniform appearance of the light reflections 204 across the plurality of images indicates that the inspection system 100 maintains consistent lighting conditions, an important factor for reliable surface defect detection by the machine learning model executed by the control system 500.

Among the bearing balls shown, defects 206 are visibly present on bearing balls 202A, 202F, and 202G. These defects 206 can take various forms, including surface cracks, pits, inclusions, or other material discontinuities that interrupt the smooth spherical geometry of the bearing ball surfaces. The defects 206 are accentuated under the system's ultraviolet illumination, which excites the dye coating 602 applied to each bearing ball prior to inspection. The dye coating 602 is configured to penetrate surface discontinuities, fluorescing under UV light, and enhancing defect visibility relative to the surrounding intact material.

In an exemplary embodiment, the bearing ball inspection system 100 captures and processes such inspection images using a plurality of cameras 102 arranged around the positioning wheel 110. The use of multiple imaging angles ensures that defects located on various parts of the bearing ball surface, including difficult-to-view regions near the ball's equator or poles, are not missed. By contrast, prior approaches that relied on single-angle or manually manipulated imaging often suffered from incomplete surface coverage, leading to undetected defects and inconsistent inspection outcomes.

Each bearing ball 202A-202H is shown in a captured image where surface features, including reflections, dye distribution, and defect signatures, are rendered with high clarity. This image quality enables the machine learning model to more accurately distinguish between acceptable surface variations, such as minor surface texture or manufacturing marks, and true defects 206 that could compromise bearing ball performance in end-use applications.

The visible dye coating 602 across the bearing balls further supports consistent inspection outcomes by standardizing contrast between intact and defective regions. The uniform application of the dye coating 602, combined with the precise illumination provided by the light sources 124, enables the inspection system 100 to operate with high sensitivity and specificity. Additionally, the consistency of the three-dot reflection pattern 204 across all bearing balls demonstrates that the optical system maintains consistent lighting geometry between inspections, an important feature for ensuring repeatable machine learning classification performance.

Overall, FIG. 7 illustrates the effectiveness of the bearing ball inspection system 100 in capturing high-quality inspection images from multiple perspectives under controlled lighting conditions. The ability to simultaneously image multiple bearing balls 202A-202H, identify defects 206 with high contrast, and maintain consistent optical alignment contributes to the system's improved inspection reliability, throughput, and defect detection accuracy compared to prior manual or single-camera approaches.

Figure 8:
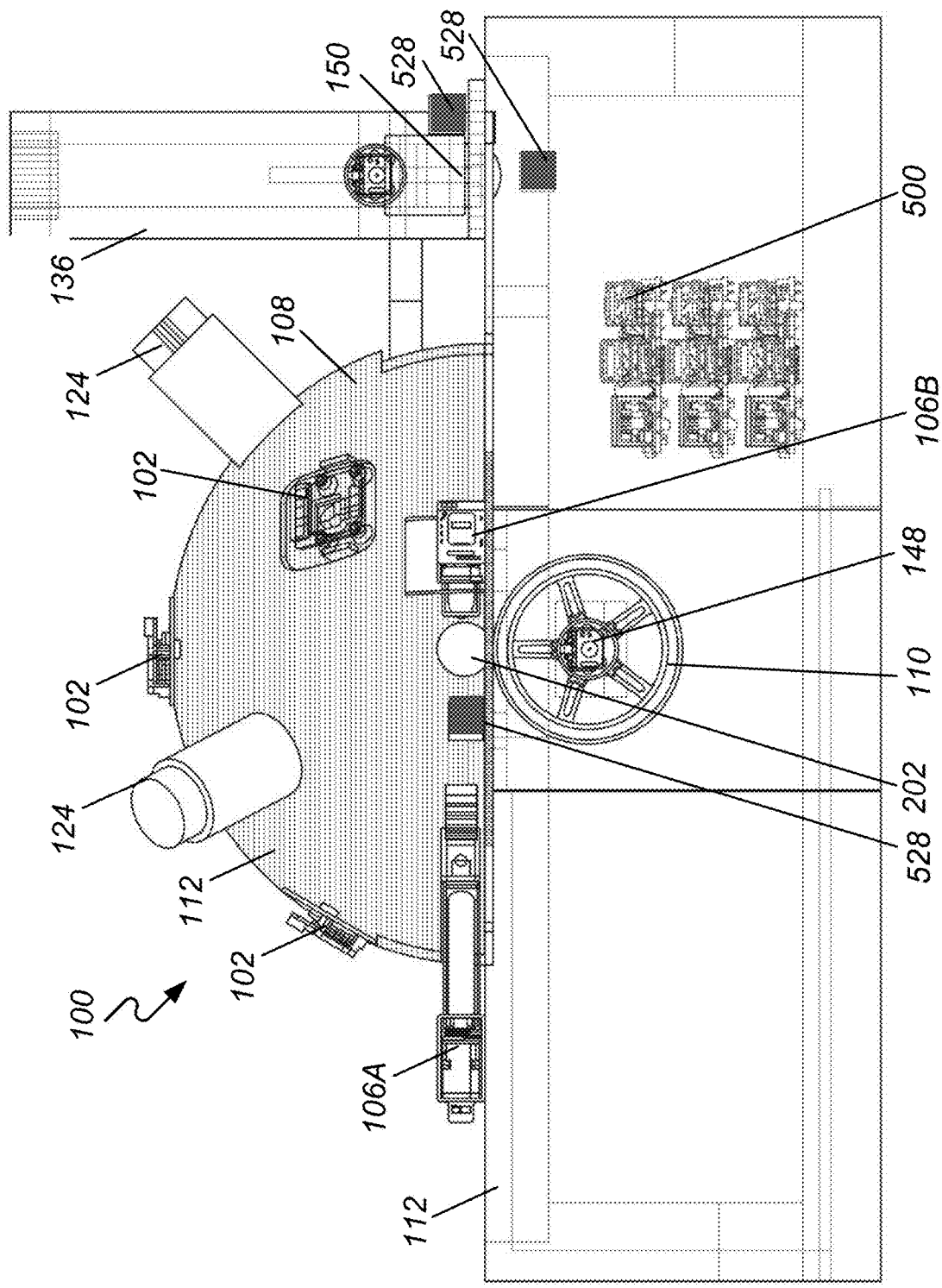
FIG. 8 illustrates one example of a bearing ball inspection system showing the position wheel and control system within the enclosure.

Referring to FIG. 8, there is illustrated one example of a bearing ball inspection system 100 showing the positioning wheel 110 and the control system 500 within the enclosure 112. In an exemplary embodiment, FIG. 8 provides a clearer view of the internal arrangement of core mechanical and electronic components, with the top cover 144 and inspection area cover 108 removed to expose the operational elements of the system.

Centrally positioned within the system is the positioning wheel 110, which is configured to support a bearing ball 202 during inspection operations. The positioning wheel 110 can be rotated about a horizontal axis under control of a position wheel actuator 148, allowing the bearing ball 202 to be reoriented to expose multiple surface regions to the surrounding cameras 102 and light sources 124. This rotation capability enables comprehensive surface coverage during the inspection process, ensuring that both the upper and lower hemispheres of the bearing ball 202 are imaged with high fidelity.

The placement of the positioning wheel 110 relative to the surrounding structure ensures that the bearing ball 202 remains centrally located within the inspection point 116, aligned symmetrically with the optical and illumination systems. This fixed spatial relationship improves the repeatability of captured images, which is critical for consistent defect analysis using the machine learning model executed by the control system 500.

Located beneath the positioning wheel 110 and securely housed within the lower portion of the enclosure 112 is the control system 500. The control system 500 comprises a microprocessor, a memory, a communication interface 508, and the various control circuitry necessary to operate the cameras 102, light sources 124, actuators 106A-106C, and associated motion components. The control system 500 can also include the power supply 516 and can be thermally regulated through airflow generated by the fan 146, which is positioned along the rear of the enclosure 112, as seen in prior figures.

In an exemplary embodiment, at least one position sensor 528 can be provided and operatively connected to the control system 500 to support synchronized operation of the bearing ball inspection system 100. Multiple instances of position sensor 528 can be deployed at different functional locations to detect specific system states.

A first position sensor 528 can be mounted near the inspection point 116 and configured to detect the presence of a bearing ball 202 positioned on the positioning wheel 110. This sensor provides real-time confirmation that a bearing ball has arrived at the inspection zone, allowing the control system 500 to trigger image capture, illumination, and subsequent rotation sequences only when a ball is properly seated. This enhances image reliability and prevents timing errors that may occur if a ball is missing or misaligned.

A second position sensor 528 can be located adjacent to the inlet gate 130 and configured to detect the presence of a bearing ball awaiting release. This enables the control system 500 to verify ball availability before actuating the release mechanism 132, ensuring that only one bearing ball is released at a time and that the ball feed remains continuous and orderly.

A third position sensor 528 can be configured to detect the position of the inlet gate 130 itself. This feedback allows the control system 500 to monitor and control the gate actuation timing with greater precision, coordinating release events with downstream system readiness to avoid jamming or double-feeding errors.

Collectively, the deployment of these position sensors 528 enables the system to operate in a closed-loop control mode, where real-time position feedback is used to synchronize bearing ball delivery, image acquisition, and sorting operations. This enhances overall system accuracy, repeatability, and fault tolerance during high-throughput inspection tasks.

The absence of the top cover 144 in FIG. 8 provides an unobstructed view of the internal layout, showcasing the compact and efficient integration of mechanical and electrical subsystems. This arrangement allows for straightforward maintenance access while preserving the rigidity and stability required for precise imaging. The configuration demonstrated here supports rapid servicing or replacement of the positioning wheel 110, cameras 102, or light sources 124 without needing to dismantle or disturb the critical calibration of the control system 500.

In an exemplary embodiment, the separation of optical, mechanical, and electronic zones within the enclosure 112 offers several advantages compared to prior approaches. Prior inspection systems often lacked clear spatial organization, leading to component interference, heat management problems, and service difficulties. By contrast, the present invention organizes mechanical handling, optical imaging, and electronic control into distinct layers, improving reliability, ease of calibration, and thermal stability.

Furthermore, by locating the control system 500 securely within the protected environment of the enclosure 112, the system minimizes exposure to dust, vibration, and ambient temperature fluctuations, all of which can degrade performance in demanding industrial inspection environments.

Figure 9:
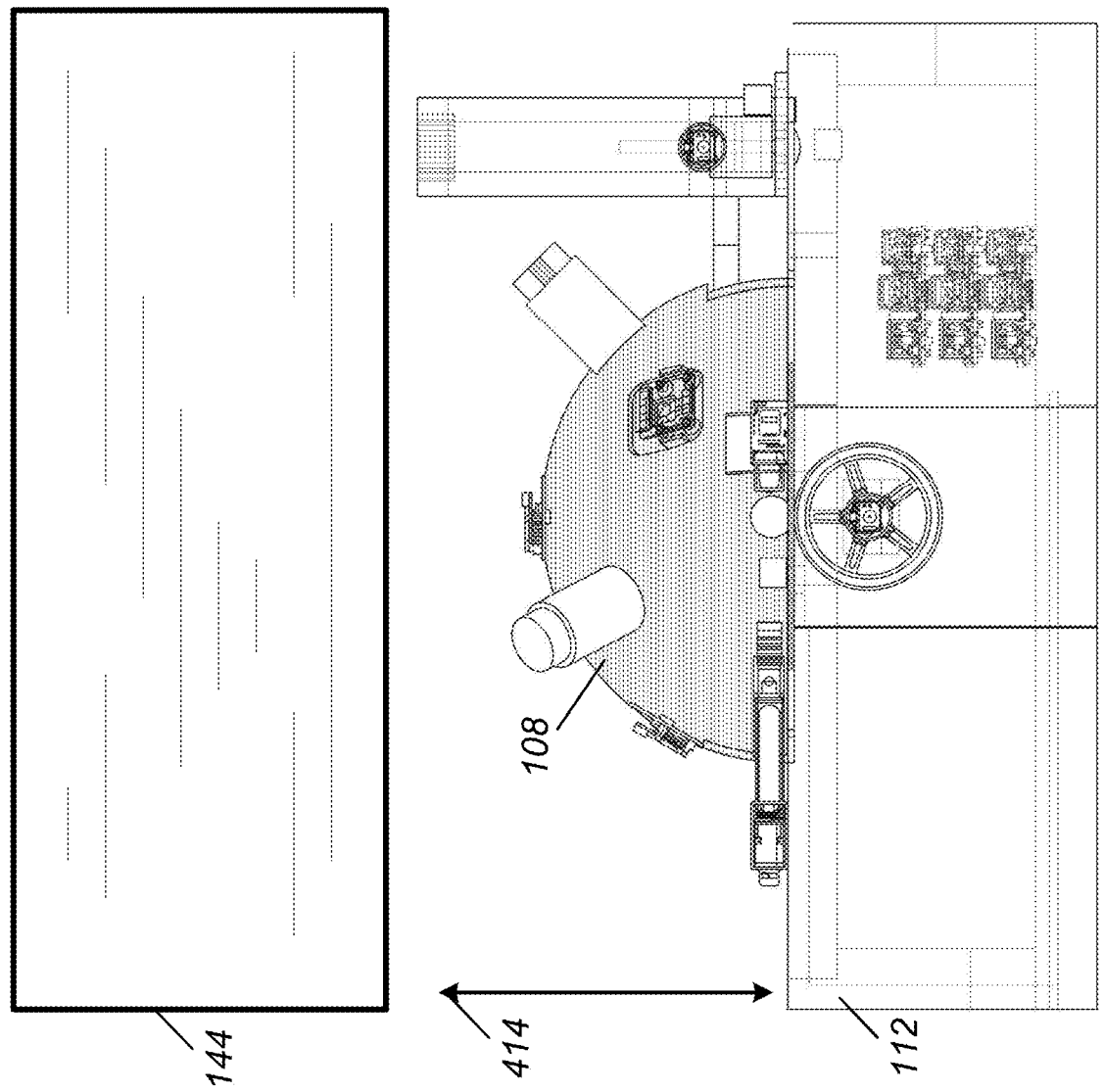
FIG. 9 illustrates one example of a bearing ball inspection system showing the top cover.

Referring to FIG. 9, there is illustrated one example of a bearing ball inspection system 100 showing the top cover 144 positioned relative to the enclosure 112. In an exemplary embodiment, FIG. 9 highlights how the top cover 144 can be placed onto or removed from the bearing ball inspection system 100, as indicated by motion arrow 414.

The top cover 144 is configured to overlay the inspection area cover 108 and the surrounding structural elements of the enclosure 112. The cover 144 can be fabricated from a durable, lightweight material to provide mechanical protection to the underlying inspection zone and system electronics. By installing the top cover 144, the system is protected from incidental contact, dust, debris, and other environmental hazards that could otherwise degrade inspection performance or damage internal components.

Motion arrow 414 indicates that the top cover 144 can be easily lifted or lowered relative to the enclosure 112. In an exemplary embodiment, the top cover 144 can engage with one or more top cover latches 142, which are configured to secure the cover 144 in a closed position during normal operation. These latches can be manually actuated without the need for tools, allowing for rapid access to the internal components for maintenance, calibration, or bearing ball handling tasks.

From this rearward or angled view, the spatial relationship between the top cover 144, the inspection area cover 108, and the main body of the enclosure 112 is more readily appreciated. The design ensures that even when the top cover 144 is removed, the inspection area cover 108 remains in place over the inspection point 116, thereby preserving the controlled inspection environment. This layered protective design offers advantages over prior approaches, where the removal of exterior covers often exposed sensitive optical or electronic components directly to the surrounding environment.

The modular nature of the top cover 144 further supports the flexibility and adaptability of the system 100. For example, in production environments requiring frequent cleaning or inspection of the positioning wheel 110 and cameras 102, the ability to quickly remove and reinstall the top cover 144 minimizes downtime and reduces the risk of misalignment or damage to critical components. In addition, during system upgrades or reconfiguration for different bearing ball sizes or inspection protocols, access provided by the removable top cover 144 simplifies retrofitting or replacement procedures.

The overall structure shown in FIG. 9 demonstrates how the bearing ball inspection system 100 is engineered for both operational robustness and serviceability. The top cover 144 enhances physical protection during active use, while motion 414 illustrates how ergonomic design considerations enable technicians to maintain the system quickly and efficiently without specialized tools or extended disassembly steps.

In an exemplary embodiment, the inclusion of an easily removable and replaceable top cover 144 supports the broader goal of the system: delivering high-accuracy, high-throughput inspection performance while minimizing total cost of ownership through improved maintainability and reliability.

Referring to FIG. 10, there is illustrated one example of a control system block diagram for the bearing ball inspection system 100. In an exemplary embodiment, the control system 500 is configured to manage the operational logic, motion control, illumination, image capture, data analysis, sorting, and remote communication functions of the inspection system.

At the core of the control system 500 is a microcontroller 502, which governs real-time processing, defect detection workflows, actuator sequencing, and data logging. The microcontroller 502 is electrically connected to a memory 504, which can include volatile and non-volatile memory types for storing inspection routines, image processing algorithms, defect classification parameters, and firmware updates.

The microcontroller 502 can be implemented using commercially available processors such as INTEL, ARM, AMD, MICROCHIP, ZILOG, or other suitable platforms, and can run embedded operating systems including Linux, QNX, or lightweight real-time kernels adapted for inspection environments.

The memory 504 can include a combination of RAM, ROM, EEPROM, flash storage, solid-state drives, or external storage devices such as USB flash drives, depending on the system configuration.

A display 506, optionally integrated with a general-purpose input/output (GPIO) interface 510, provides a local user interface for system interaction. The display 506 can present real-time system status indicators such as inspection pass/fail counts, error alerts, camera diagnostics, and illumination modes, and may be implemented as a touchscreen or digital dashboard for selecting operating modes, initiating test sequences, or performing local diagnostics.

A communication interface 508 is provided to enable wired or wireless connectivity between the control system 500 and external resources, including one or more remote data processing resources 702 and computing devices 732. The communication interface 508 supports protocols such as Wi-Fi, Ethernet, Bluetooth, 4G/5G, RS232, USB, and other suitable standards, enabling remote access to inspection metrics, firmware updates, remote control instructions, and system health telemetry. This infrastructure supports integration into centralized quality management platforms or cloud-based monitoring systems over a global network 700 such as the Internet.

The communication interface 508 also enables the system to transmit inspection data and system diagnostics to cloud-based dashboards, where administrators or technicians may review real-time analytics, configure thresholds, and initiate remote inspections or override commands. In some embodiments, GPS functionality 514 may be provided to track system location for asset management or geofenced inspection compliance across distributed manufacturing environments.

The control system 500 can be configured to receive inputs from a variety of sensors 512, including thermal sensors, vibration sensors, ambient light sensors, or internal diagnostics sensors that monitor the condition of optical components, actuators, or electronic subsystems. These sensors 512 provide feedback that supports closed-loop system control and predictive maintenance alerts.

Power to the control system 500 is supplied by a power supply 516, which can support a variety of input types such as AC mains (110-240V), low-voltage DC, or battery power for portable inspection units. In some implementations, hybrid or redundant power configurations may be supported for environments requiring high reliability.

The control system 500 includes multiple dedicated subsystems, each managed by its own controller:

A fan controller 520 can be operatively connected to one or more cooling fans 146 configured to maintain thermal stability within the enclosure 112.

A light controller 522 manages one or more light sources 124, which can include ultraviolet light for dye-penetrant inspections, white-light for metallic bearing ball inspections, or other suitable light sources.

A camera controller 524 can be connected to a plurality of cameras 102 responsible for capturing high-resolution inspection images from multiple angles.

A motor/gate controller 526 can be operatively coupled to one or more motors 148 that drive mechanical subsystems within the inspection system. In an exemplary embodiment, the motor/gate controller 526 is configured to rotate the positioning wheel 110, enabling repositioning of the bearing ball 202 during the inspection cycle to expose different surface regions for imaging. The motor/gate controller 526 is further configured to control the rotational motion of the inlet gate 130, which is not a traditional opening/closing gate but instead operates by sweeping the bearing ball 202 from a staging position 150 proximate to the gate. As the inlet gate 130 rotates, it transfers a single bearing ball from the staging position 150 onto the rail guide 104 or directly toward the inspection point 116. This controlled motion ensures orderly one-at-a-time ball delivery and proper spacing between sequential inspection cycles, supporting synchronized inspection operations in conjunction with the system's position sensors and imaging subsystems.

At least one position sensor 528 can be provided and operatively connected to the control system 500. The position sensor 528 can be configured to detect the presence of a bearing ball 202 at the inspection point 116, detect the presence of a bearing ball 202 at the inlet gate 130, detect the position of the inlet gate 130 itself, or detect the presence or position of other objects or features of the present invention, as may be required and/or desired in a particular embodiment. In various embodiments, these sensors enable the control system 500 to synchronize ball delivery and positioning, imaging, and sorting operations based on real-time position feedback.

In some embodiments, the GPIO interface 510 may also support local manual input through pushbuttons, rotary selectors, user interfaces, or maintenance panel switches, and may drive output signals such as indicator LEDs or actuator triggers during calibration or diagnostic routines. The GPIO 510 can also support embedded biometric readers or secured access control to restrict configuration changes or critical commands to authorized users.

Through this integrated architecture, the control system 500 manages data acquisition, illumination timing, defect analysis, sorting operations, remote interface management, and system diagnostics in real time. The modular, programmable structure of the control system enables the bearing ball inspection system 100 to support high-throughput, reliable inspection processes with the added benefit of networked visibility and remote configurability for distributed quality assurance applications.

Figure 11:
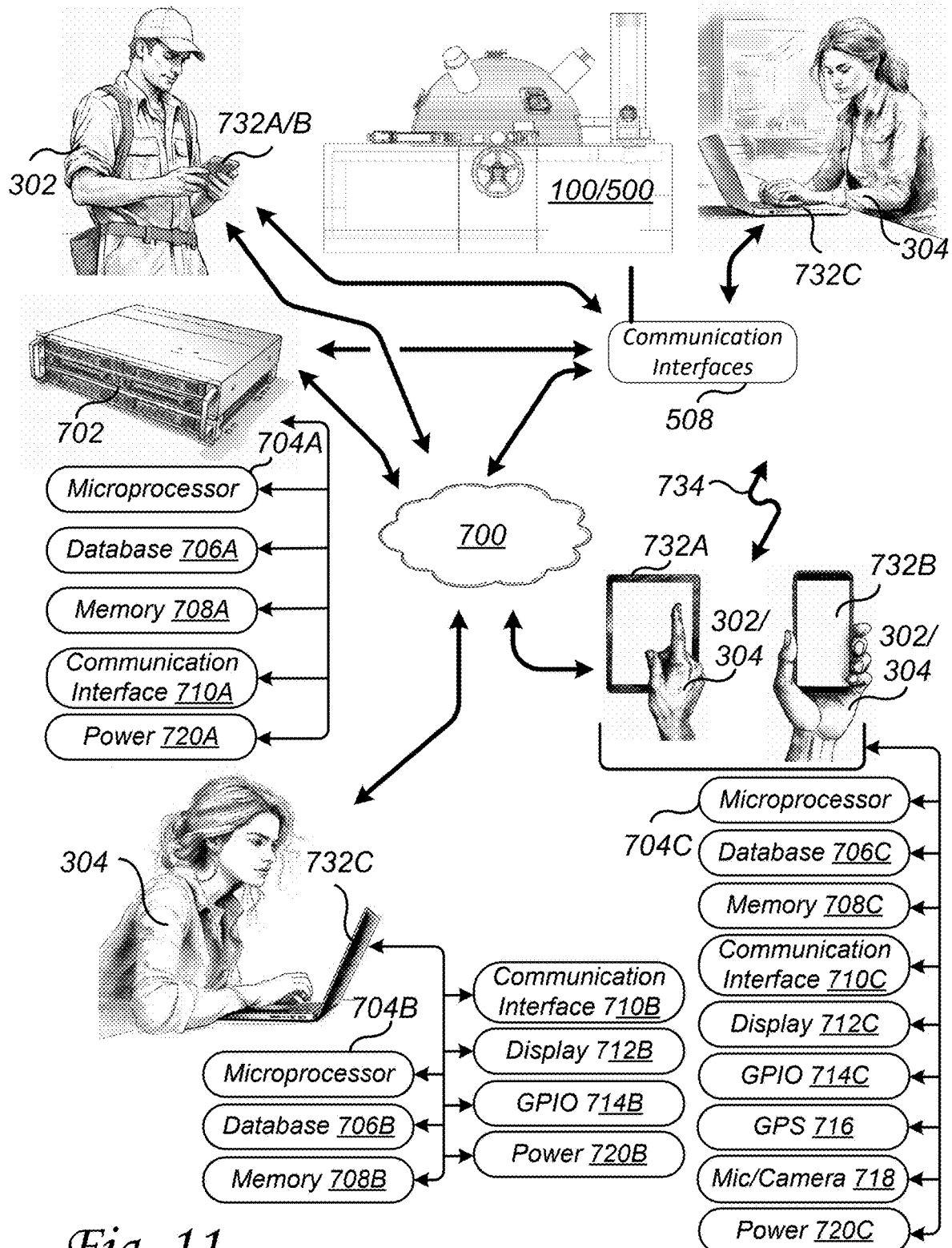
FIG. 11 illustrates one example of an information technology system and network diagram.

Referring to FIG. 11, there is illustrated one example of a network system diagram associated with the bearing ball inspection system 100. In an exemplary embodiment, the system is configured as an Internet-enabled (IoT) platform that enables real-time data communication between one or more deployed bearing ball inspection systems and remote computing infrastructure over a global communication network 700, such as the Internet. This networked capability allows the system to support centralized monitoring, distributed inspection system management, automated alert generation, service history tracking, and operational control, accessible by both local technicians and remote administrators.

This integrated connectivity architecture significantly enhances the reliability, maintainability, and auditability of the bearing ball inspection system 100. It positions the system for deployment in high-compliance environments such as aerospace manufacturing, precision ball production, industrial quality control lines, and other sectors where consistent surface inspection outcomes and traceable operational performance are critical.

The bearing ball inspection system 100 includes a control system 500 equipped with a communication interface 508 configured to enable secure data transmission to and from one or more remote data processing resources 702. These remote resources can be implemented as cloud-hosted servers, enterprise-controlled infrastructure, or hybrid cloud models. Each remote server 702 can include a microprocessor 704A, a memory module 708A, and a communication interface 710A, all operatively connected to a database 706A that stores an inspection record database 800. The inspection record database 800 can maintain critical operational and compliance data, such as inspection results, bearing ball defect rates, equipment service history, technician activity logs, and system-generated notifications. This repository enables users to generate maintenance schedules, validate inspection throughput, demonstrate compliance with customer or regulatory standards, and manage lifecycle events for deployed systems.

Remote interaction with the bearing ball inspection system 100 can also occur through one or more computing devices 732, which can include smartphones 732A, tablets 732B, and laptops or desktop computers 732C. Each computing device 732 is configured with a microprocessor (704B or 704C), memory (708B or 708C), and database storage (706B or 706C), along with a communication interface (710B or 710C) that enables network communication with the control system 500 and/or the remote server 702. User interfaces presented on displays 712B or 712C can provide real-time visibility into inspection operations, maintenance status, defect statistics, and alerts. General Purpose Input/Output (GPIO) components 714B or 714C may support technician-facing peripherals such as barcode scanners, RFID readers, or additional sensors.

Some mobile or portable computing devices may also include integrated GPS modules 716, microphones, or cameras 718. These features can be used for location tagging of inspection system deployments, remote support diagnostics, or field reporting. Power for these computing devices can be provided by rechargeable batteries or external AC adapters 720B and 720C, depending on device type and intended field usage.

Field technicians 302 and system administrators 304 can use these mobile or desktop interfaces to view installed inspection system records, initiate diagnostic routines, access troubleshooting logs, issue remote control instructions (such as initiating test inspections or updating inspection parameters), or perform firmware updates. In an exemplary embodiment, remote users can initiate real-time inspections, override error states, recalibrate optical systems, or schedule preventive maintenance operations directly from remote terminals without requiring direct physical access to the bearing ball inspection system 100.

Through this integrated information technology platform, the bearing ball inspection system 100 is able to deliver proactive alerts regarding operational anomalies, validate inspection consistency across deployed fleets, and offer both local and remote access to critical operational metrics. The Internet-connected architecture enables administrators to manage large numbers of systems across distributed production sites, while allowing field technicians to efficiently diagnose, service, and validate proper operation of individual systems. Furthermore, firmware updates, new defect detection algorithms, or inspection parameter profiles can be securely pushed to the systems from the cloud infrastructure, enhancing system capabilities without requiring hardware replacement or manual reprogramming.

Figure 12:
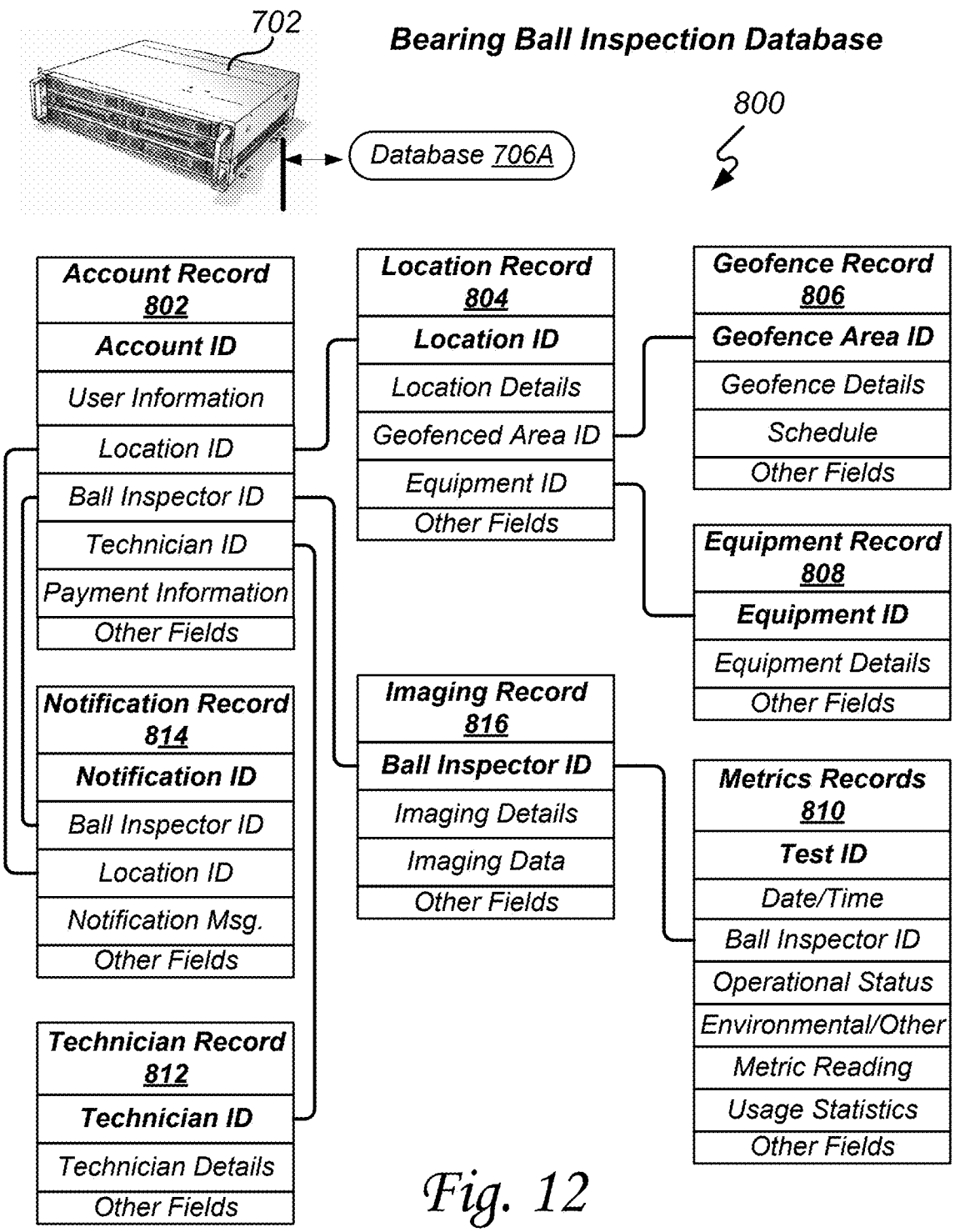
FIG. 12 illustrates one example of a bearing ball database structure.

Referring to FIG. 12, there is illustrated one example of a bearing ball inspection database structure 800 for use with the bearing ball inspection system 100. The database structure 800 is designed to organize, track, and manage a range of inspection-related, operational, maintenance, and performance records associated with one or more deployed systems 100. In an exemplary embodiment, the database 800 can be hosted on a remote data processing resource 702 or accessed by one or more computing devices 732A-C operated by a technician 302 or an administrative user 304. The database 800 can be implemented using standard or scalable database technologies such as SQL, MySQL, Oracle, MS Access, cloud-hosted flat files, or other suitable storage architectures.

Within database 800, a variety of record types can be maintained to support the operation, monitoring, and life-cycle management of the bearing ball inspection system 100. These include account records 802, location records 804, geofence records 806, equipment records 808, metrics records 810, technician records 812, notification records 814, and imaging system records 816. Each record type is configured to store structured data related to system access, deployment, inspection performance, maintenance activity, alerts, and imaging calibration. Collectively, these records enable comprehensive system oversight, data-driven diagnostics, and integration with remote service platforms.

The account records 802 store user authentication credentials, system access privileges, and service-tier designations for individuals or organizations authorized to operate or administer the bearing ball inspection system 100. These records enable role-based access control and can support administrative audit trails tied to user activity within local or remote system interfaces.

The location records 804 are used to associate each deployed inspection system 100 with a physical site or facility, such as a manufacturing plant, quality control lab, or shipping hub. These records may include address details, facility identifiers, time zone settings, and environmental conditions relevant to the inspection workflow. Location mapping enables targeted reporting and system grouping based on geographic deployment.

The geofence records 806 defines virtual geographic boundaries around authorized installation sites. These boundaries can be used to enforce location-specific operating rules, restrict access or inspection functions outside approved zones, or validate the presence of mobile inspection units within designated service areas. Integration with GPS modules and system telemetry allows real-time geofence enforcement.

The equipment records 808 contain detailed metadata for each individual bearing ball inspection system 100. These records include serial numbers, hardware and firmware versions, installed component identifiers, and model configurations (e.g., ultraviolet/dye-based or white-light inspection modes). Equipment records may also store the associated machine learning model identifier, current operational status, and links to historical usage logs or maintenance activity. This data structure enables complete lifecycle tracking, supports version control for hardware and software components, and facilitates proactive maintenance planning across an installed base of systems.

The metrics records 810 serve as detailed performance and inspection data logs for each bearing ball inspection system 100. Generated by the control system 500, these records include timestamped inspection results such as defect detection outcomes, pass/fail classifications, image capture counts, system uptime, and job throughput statistics. Additional metadata may be stored, including surface reflectivity measurements, machine learning model confidence scores, diagnostic error flags, and image-specific data from the first and second sets of images. System-specific thresholds and inspection parameters used during analysis can also be recorded. Each metrics record is cross-referenced to a specific system instance and job identifier, enabling traceability and longitudinal performance analysis. These records support quality assurance reporting, model tuning, and preventive maintenance planning across one or more deployed systems.

Technician records 812 track service interactions, including in-person maintenance, software or firmware updates, remote diagnostics, and physical component replacements. These records can be linked to service personnel credentials and timestamps, and may be generated locally via a dashboard display or remotely via computing devices 732A-C.

Notification records 814 store automated system alerts generated by the control system 500. These may include inspection result anomalies, component wear warnings (e.g., for motors, light sources, or sensors), system errors, or remote access triggers. Customizable notification templates can also include inspection throughput statistics, deviation alerts, or system health summaries transmitted to authorized users.

Imaging system records 816 stores captured sets of bearing inspection images and analysis results, calibration history, and performance profiles for the plurality of cameras, light sources, and positioning systems. These may include lens alignment logs, exposure calibration data, white balance history, and tracking of system adjustments based on reflectivity or lighting conditions. These records support consistent imaging fidelity and machine learning model accuracy over time.

The modular and connected nature of the bearing ball inspection system 100 allows the database 800 to support installations with varying configurations, including UV-based, white-light-based, or hybrid inspection modes, and systems with remote control capabilities. The structured data architecture enables centralized monitoring, scalable service management, predictive diagnostics, inspection images and analysis results, and historical traceability across an installed base of inspection systems deployed in quality control environments.

Figure 13:
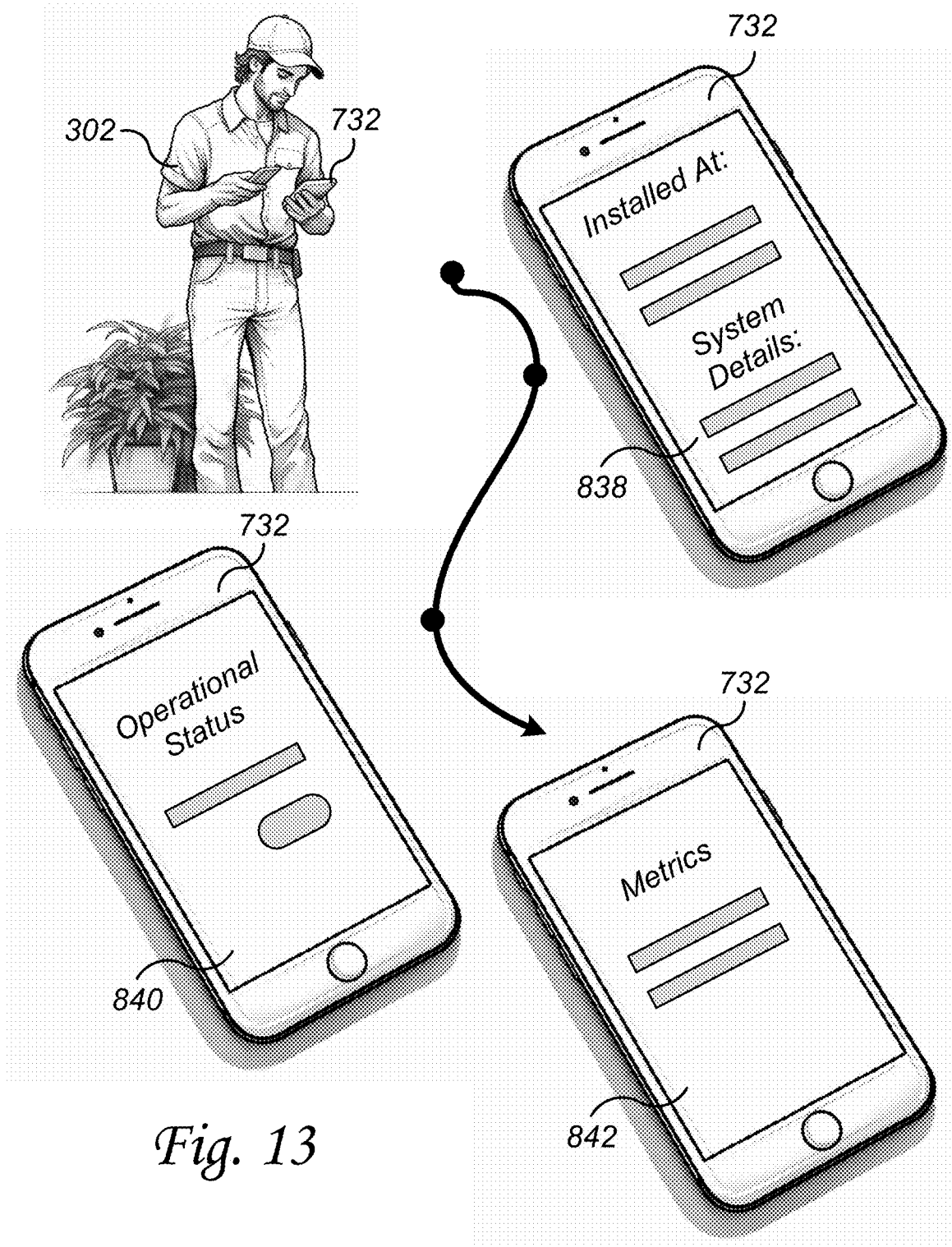
FIG. 13 illustrates one example of a technician's use of a software application.

Referring to FIG. 13, there is illustrated one example of a technician's use of a software application for monitoring and servicing the bearing ball inspection system 100. In an exemplary embodiment, a technician 302 uses a computing device 732, which can include a smartphone 732A, tablet 732B, or laptop/desktop computer 732C, to access a graphical user interface of a service or maintenance application. This application is configured to manage various features of the inspection system 100 and communicate in real time with a remote data processing resource 702 over a global communication network 700. Through this connection, the technician can retrieve system-level diagnostics, review inspection outcomes, synchronize service records, and monitor hardware performance across one or more deployed systems.

A first screenshot 838 illustrates an overview display of the installed system, including its location, serial number, inspection mode (e.g., UV/dye-based or white-light), hardware configuration, installation date, and firmware version.

This view enables the technician to confirm system identity, hardware model, and software status prior to initiating service actions.

A second screenshot 840 illustrates the system's operational status, including the current inspection cycle state (e.g., idle, active, paused), imaging activity, actuator status, illumination conditions, and internal sensor data such as component temperature, vibration level, or part engagement feedback. This interface allows the technician to confirm that the inspection system is functioning within configured parameters and optionally initiate test cycles or perform diagnostic routines.

A third screenshot 842 presents component status and metrics information, such as the remaining estimated service life of high-use components (e.g., the light source, positioning wheel motor, or camera assembly), as well as recent usage data and replacement history. The interface may also display alerts for recalibration, component wear, or pending maintenance intervals. These features help ensure proactive maintenance and reduce the likelihood of system downtime or inspection errors.

Figure 14:
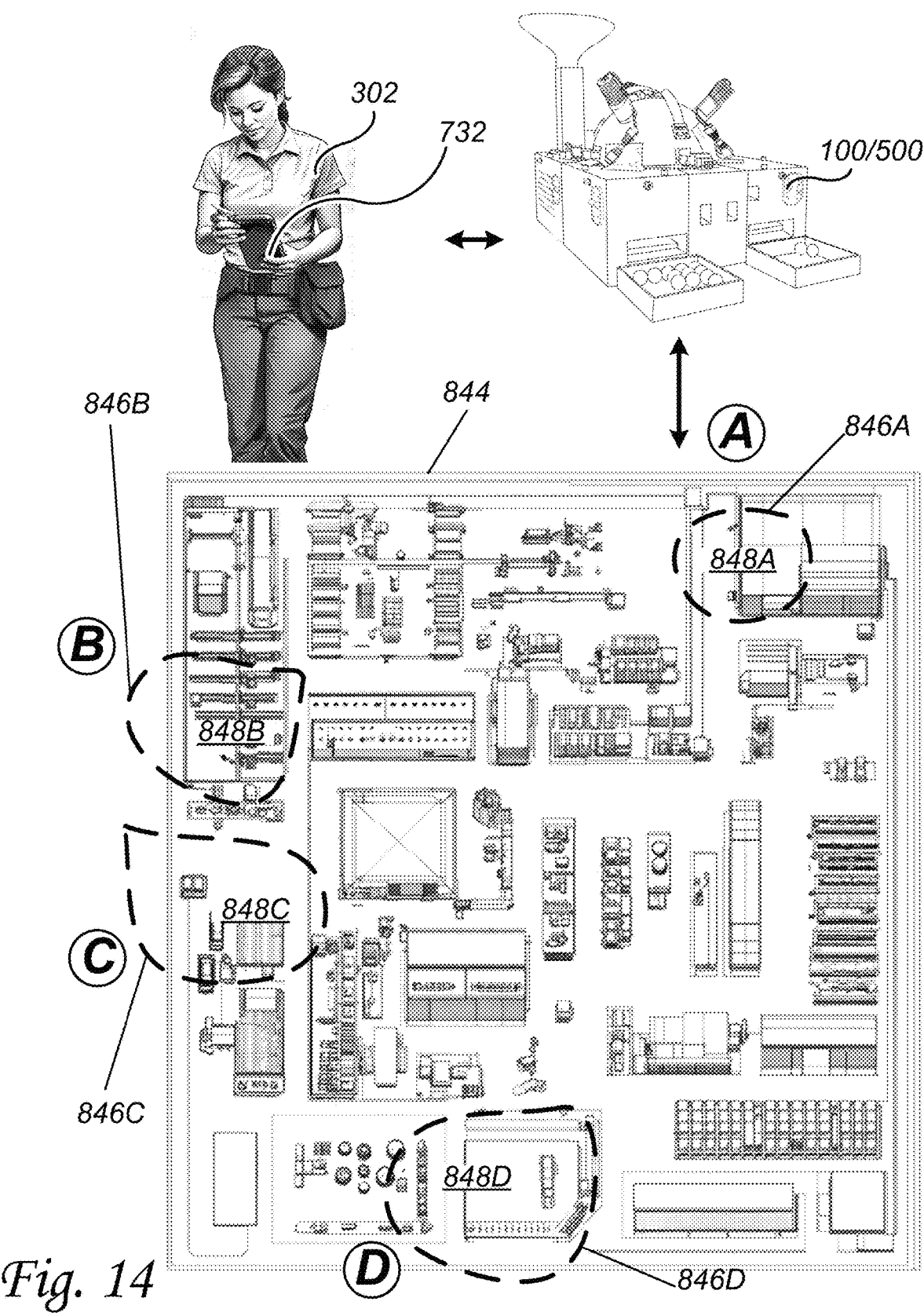
FIG. 14 illustrates one example of a floor plan to monitor geofenced or geolocate room spaces that have installed a bearing ball inspection system.

Referring to FIG. 14, there is illustrated one example of a floor plan 844 configured to enable monitoring of geofenced or geolocated room spaces in which one or more bearing ball inspection systems 100 have been installed. In an exemplary embodiment, each designated area, such as a quality control lab, cleanroom, inspection bay, or production cell, is assigned a monitored zone 846A-D. These zones represent physically distinct areas within a facility where system placement, inspection activity, and technician interaction can be tracked and managed.

A room identifier 848A-D can be associated with each monitored zone 846A-D to facilitate spatial tracking and system correlation. An installed system identifier 850 can indicate which specific bearing ball inspection system 100 is deployed in that room or zone. These identifiers and their associated metadata can be centrally managed by a remote data processing resource 702 and synchronized with a computing device 732 used by a technician 302. In some embodiments, the identifiers, status information, and zone overlays can be visualized in real time through a dashboard or service application running on the technician's computing device.

Each bearing ball inspection system 100 installed within a geofenced zone can be configured to follow location-specific inspection schedules, usage restrictions, or sensor-verified operation protocols. Integration with location-aware technologies, such as GPS 514 or internal facility mapping, enables geofencing logic to automate compliance alerts, trigger notifications, or restrict system access based on spatial context. For instance, the system can detect technician entry into a designated zone, prompt pre-inspection verification, and log inspection cycle details, including timestamp, defect detection results, and system status for reporting to database 706A.

The technician 302 can utilize the floor plan 844 to monitor inspection activity across multiple zones, confirm that inspection routines are being performed as scheduled, and respond to exceptions such as skipped cycles or equipment alerts. This floor plan-based interface enhances operational visibility and simplifies centralized management of distributed inspection systems deployed across a facility, warehouse, or manufacturing plant. By correlating monitored zone 846, installed system ID 850, and location identifier 848, the system enables streamlined recordkeeping, traceable inspection workflows, and audit-ready reporting for internal oversight or external regulatory compliance.

Figure 15:
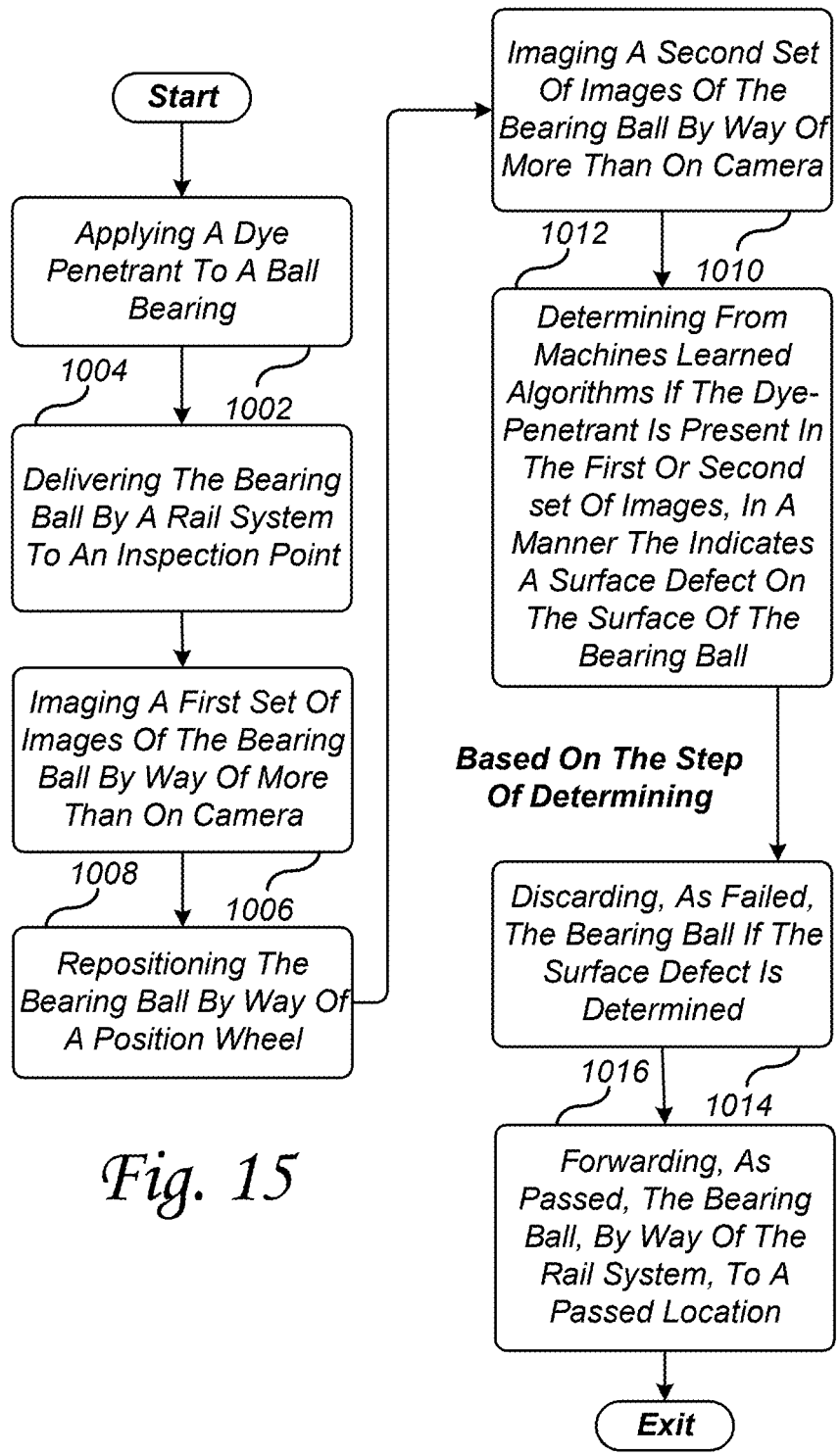

Referring to FIG. 15, there is illustrated one example of a method of inspecting bearing balls 202 using a dye-penetrant process in conjunction with a machine vision and learning-based inspection system. In an exemplary embodiment, the method utilizes the components of the bearing ball inspection system 100 described previously.

In step 1002, a dye penetrant 204 is applied to a bearing ball 202. The dye penetrant is formulated to enter and visually highlight surface defects such as cracks, pits, or inclusions when exposed to ultraviolet light. The dye may be applied by immersion, spraying, or brushing and is typically followed by a dwell time to allow the dye to seep into any existing surface discontinuities. After dwell time, any excess dye on the surface may be removed using an appropriate cleaner, leaving only dye that has penetrated surface defects.

In step 1004, the bearing ball 202 is delivered by a rail guide 104 to an inspection point 116. The rail guide 104 includes a funnel inlet, inlet gate, and actuator-controlled track system configured to release and guide one bearing ball at a time. The ball is precisely positioned at the inspection point, where it is supported by the positioning wheel 110 for imaging.

In step 1006, a first set of images of the bearing ball 202 is captured by a plurality of cameras 102 arranged around the inspection point 116. The cameras are oriented to capture surface features from multiple perspectives, typically including a top-down camera and several side-mounted cameras positioned at a tilt angle. During this step, the bearing ball remains in a first rotational position on the positioning wheel 110.

In step 1008, the bearing ball 202 is repositioned by way of the positioning wheel 110. The positioning wheel is driven by a motor under control of the control system 500 and is configured to rotate the bearing ball to expose a different portion of its surface for further imaging. This rotation enables full circumferential coverage of the ball's surface.

In step 1010, a second set of images is captured by the same plurality of cameras 102 after the bearing ball 202 has been repositioned. The second set of images complements the first set, allowing the system to obtain comprehensive visual data covering the entire outer surface of the bearing ball.

In step 1012, the control system 500 analyzes the captured image data using a machine learning model trained on previously labeled images of dye-penetrant-coated bearing balls. The model is configured to identify whether the dye penetrant appears in either the first set or the second set of images in a pattern or region consistent with the presence of a surface defect. The detection process is fully automated and uses features such as dye brightness, shape, contrast, and positional alignment to make a classification decision.

In step 1014, if the machine learning model determines that the dye pattern is indicative of a surface defect, the system classifies the bearing ball 202 as failed. The control system then activates a sorting mechanism that redirects the bearing ball along track 114B to a fail egress 118, where it is discarded or flagged for further review.

In step 1016, if the machine learning model determines that no defect is present based on the analyzed image sets, the system classifies the bearing ball 202 as passed. The sorting mechanism is actuated to direct the bearing ball along track 114C to a pass egress 120 for collection and further use.

This method provides a highly repeatable, operator-independent process for identifying surface defects in bearing balls using dye-penetrant techniques and intelligent image analysis. By automating each step from delivery to classification, the system minimizes inspection variability, increases throughput, and reduces the potential for human error compared to manual inspection methods used in prior approaches . . .

Referring to FIG. 16, there is illustrated an exemplary method of using the bearing ball inspection system 100 to inspect metallic bearing balls without the use of dye-penetrant. In an exemplary embodiment, this method leverages white-light illumination and machine learning-based image analysis to identify surface defects in metallic bearing balls through non-contact, non-chemical inspection.

In step 1102, a metallic bearing ball is delivered to the inspection point 116 by a rail guide 104. The rail guide system includes a funnel inlet, inlet gate, and actuator-controlled track configured to release and guide a single bearing ball 202 to the inspection point. The bearing ball is transferred smoothly onto a positioning wheel 110, which supports and orients the ball during image acquisition.

In step 1104, the bearing ball is illuminated with white-light from one or more light sources 124. These light sources are positioned around the inspection point 116 to ensure even surface illumination from multiple angles. The white-light illumination enables direct visual inspection of surface characteristics such as scratches, pits, or inclusions, without the need for dye enhancement.

In step 1106, a first set of images and a second set of images are captured using a plurality of cameras 102. The first set of images is captured while the bearing ball remains in a first orientation on the positioning wheel 110. The wheel is then rotated to reposition the bearing ball, after which the second set of images is captured. This dual-orientation imaging ensures that the majority of the bearing ball's surface is analyzed, including regions that would otherwise be obscured from a single viewing angle.

In step 1108, the control system 500 executes a machine learning model configured to analyze the first and second sets of images. Unlike the dye-penetrant-based method, this approach does not rely on contrast-enhancing chemicals. Instead, the model is trained to detect visual anomalies directly from surface reflectivity, texture, and geometric discontinuities present in metallic bearing balls. By using image-based classification, the system identifies whether any regions of the ball exhibit characteristics consistent with surface defects.

In step 1110, based on the image analysis results, the bearing ball is sorted accordingly. If the machine learning model detects a defect, the control system activates an actuator to direct the bearing ball along track 114B to a fail egress 118. If no defect is detected, the system directs the bearing ball along track 114C to a pass egress 120. The sorting mechanism operates automatically, completing the inspection process without requiring human intervention.

This method provides a clean, efficient alternative to traditional dye-based inspection methods for metallic bearing balls, eliminating the need for chemical handling, drying, or cleaning steps. By enabling real-time inspection and classification based on high-resolution image analysis, the system significantly increases throughput and reduces the operational footprint required for quality control in industrial applications.

Referring to FIG. 17, there is illustrated one example of a method of using the bearing ball inspection system 100 in a network-connected configuration that supports remote data transmission, control input, and real-time system adjustment. In an exemplary embodiment, the method enables integration of local inspection operations with distributed quality management systems through the use of a secure communication infrastructure.

In step 1202, the inspection of bearing balls is initiated by the system. This includes system activation, execution of inspection sequences, and operation of subsystems such as the rail guide 104, positioning wheel 110, light sources 124, cameras 102, and sorting mechanisms. As the inspection progresses, surface data is captured and analyzed using the machine learning model executed by the control system 500.

In step 1204, inspection data is transmitted from the control system 500 to a remote data processing resource 702 or a computing device 732. The transmitted data may include image sets, defect classification outcomes, inspection timestamps, system diagnostics, and performance logs. Transmission occurs via the communication interface 508 using one or more supported protocols such as Wi-Fi, Ethernet, or cellular networks over a global network 700, such as the Internet.

In step 1206, the control system 500 receives control instructions from the remote data processing resource 702 or computing device 732. These instructions can include commands to adjust image capture settings, illumination intensity, actuator timing, inspection thresholds, or scheduling parameters. Remote instructions may also include diagnostic test triggers, firmware updates, or inspection mode changes initiated by technicians 302 or administrators 304 operating remote dashboards or mobile interfaces.

In step 1208, the bearing ball inspection system 100 adjusts its operation based on the received instructions. The control system 500 interprets the incoming commands and reconfigures system parameters in real time. For example, image acquisition settings may be adjusted to compensate for changes in ambient lighting or surface reflectivity, or the inspection frequency may be increased in response to production demand. Adjustments can be applied dynamically without requiring physical access to the system, allowing for remote optimization, troubleshooting, or compliance-driven modifications.

This method enables closed-loop integration of the bearing ball inspection process with remote quality assurance infrastructure. It supports proactive system management, faster issue resolution, and data-driven calibration of inspection performance. Compared to prior approaches, which relied on manual oversight or localized configuration, the present method enables secure, scalable, and intelligent control of inspection operations across distributed environments.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention, can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A bearing ball inspection system comprising:
   a rail guide configured to deliver a bearing ball to an inspection point, the rail guide comprising:
      an inlet gate configured to rotate in a sweeping motion to release one bearing ball at a time toward the inspection point;
      a funnel inlet configured to receive a plurality of bearing balls and direct each of the bearing balls toward the inlet gate; and
      a ball aligner operatively coupled to an actuator and configured to guide the released bearing ball onto a positioning wheel for inspection;
   a light source configured to illuminate the bearing ball;
   a plurality of cameras positioned around the inspection point and configured to capture a first set of images of a first surface of the bearing ball;
   the positioning wheel located at the inspection point and configured to support and rotate the bearing ball during inspection to reposition the bearing ball to expose a second surface;
   the plurality of cameras further configured to capture a second set of images after repositioning;
   a control system comprising a microprocessor, a memory, and a communication interface;
   a machine learning model configured to analyze the first set of images and the second set of images to detect a defect on a surface of the bearing ball, wherein the analysis is performed by the control system, or by a connected computing device or a remote data processing resource via the communication interface; and
   a sorting mechanism configured to direct the bearing ball to a fail egress if the defect is detected by the machine learning model, or to a pass egress if no defect is detected by the machine learning model.

2. The bearing ball inspection system of claim 1, wherein the light source comprises at least three ultraviolet emitters spaced approximately 120 degrees apart around the inspection point.

3. The bearing ball inspection system of claim 1, wherein the plurality of cameras includes a top-down camera and three side cameras, each positioned at a tilt angle relative to the horizontal plane of the inspection point.

4. The bearing ball inspection system of claim 1, wherein the control system is further configured to adapt one or more inspection parameters in real time based on an output confidence score from the machine learning model.

5. The bearing ball inspection system of claim 1, wherein the sorting mechanism comprises:
   a first actuator configured to eject the bearing ball to a fail egress; and
   a second actuator configured to eject the bearing ball to a pass egress.

6. The bearing ball inspection system of claim 1, wherein the communication interface is configured to:
   transmit inspection results, defect classifications, and system status information to the computing device or the remote data processing resource; and
   receive control instructions from the computing device or the remote data processing resource, to modify one or more system parameters, including camera settings, illumination levels, or actuator timing.

7. A method of using the bearing ball inspection system of claim 1, the method comprising the steps of:
   applying a dye penetrant to the bearing ball;
   delivering the bearing ball to the inspection point via the rail guide;
   illuminating the bearing ball with the light source;
   capturing a first set of images of a first surface of the bearing ball using the plurality of cameras;
   rotating the bearing ball using the positioning wheel to expose a second surface;
   capturing a second set of images of the second surface of the bearing ball using the plurality of cameras;
   analyzing the first set of images and the second set of images using the machine learning model executed by the control system, or by the computing device or the remote data processing resource via the communication interface; and
   sorting the bearing ball using the sorting mechanism based on whether a defect is detected in the analysis.

8. A bearing ball inspection system comprising:
   a rail guide configured to deliver a bearing ball to an inspection point, the rail guide comprising:
      an inlet gate configured to rotate in a sweeping motion to release one bearing ball at a time toward the inspection point;
      a funnel inlet configured to receive a plurality of bearing balls and direct each of the bearing balls toward an inlet gate; and
      a ball aligner operatively coupled to an actuator and configured to guide the released bearing ball onto a positioning wheel for inspection;
   the positioning wheel configured to rotate the bearing ball during inspection and to minimize vibrational movement of the bearing ball during imaging;
   a plurality of cameras configured to capture a first set of images and a second set of images of the bearing ball;
   a light source configured to illuminate the bearing ball;
   a control system comprising a microprocessor, a memory, and a communication interface;
   a machine learning model configured to analyze the first set of images and the second set of images to detect a defect on a surface of the bearing ball, wherein the analysis is performed by the control system, or by a connected computing device or a remote data processing resource via the communication interface; and
   a sorting mechanism configured to direct the bearing ball to a fail location if the defect is detected by the machine learning model, or to a pass location if no defect is detected by the machine learning model;
   wherein the control system is configured to dynamically adjust camera exposure parameters based on the surface reflectivity of the bearing ball.

9. The bearing ball inspection system of claim 8, wherein the communication interface of the control system is configured to:
   transmit inspection results and operational status to the computing device or the remote data processing resource; and
   receive control instructions from the computing device or the remote data processing resource, to adjust inspection parameters or initiate inspection cycles.

10. The bearing ball inspection system of claim 8, wherein the control system is configured to construct a composite image of the bearing ball from the first set of images and the second set of images, and to provide the composite image as input to the machine learning model.

11. The bearing ball inspection system of claim 8, wherein the machine learning model is trained using images of metallic bearing balls captured under white-light illumination.

12. A method of using the bearing ball inspection system of claim 8, the method comprising the steps of:
   delivering the bearing ball to the inspection point via the rail guide;
   illuminating the bearing ball with white-light from the light source;
   capturing the first set of images and the second set of images of the bearing ball using the plurality of cameras;
   analyzing the first set of images and the second set of images without using dye-penetrant on the surface of the bearing ball, using the machine learning model executed by the control system, or by a connected computing device or remote data processing resource via the communication interface; and
   sorting the bearing ball using the sorting mechanism based on whether a defect is detected in the analysis.

13. A bearing ball inspection system comprising:
   a rail guide configured to deliver a bearing ball to an inspection point, the rail guide comprising:
      an inlet gate configured to rotate in a sweeping motion to release one bearing ball at a time toward the inspection point;
      a funnel inlet configured to receive a plurality of bearing balls and direct each of the bearing balls toward an inlet gate; and
      a ball aligner operatively coupled to an actuator and configured to guide the released bearing ball onto a positioning wheel for inspection;
   the positioning wheel located at the inspection point and configured to rotate the bearing ball during inspection;
   a plurality of cameras configured to capture a first set of images and a second set of images of the bearing ball;
   a light source configured to illuminate the bearing ball;
   a control system comprising a microprocessor, a memory, and a communication interface, the communication interface configured to transmit inspection results and operational status to a computing device or a remote data processing resource and receive control instructions to adjust inspection parameters or initiate inspection cycles;
   a machine learning model configured to analyze the first set of images and the second set of images to detect surface defects, wherein the analysis is performed by the control system, or connected by the computing device or the remote data processing resource via the communication interface; and
   a sorting mechanism configured to direct the bearing ball based on the results of the analysis, wherein the control system is further configured to:
      log inspection data and synchronize it periodically with the remote data processing resource via the communication interface;
      process the first and second sets of images into a composite image prior to analysis by the machine learning model; and
      present real-time inspection status or alert notifications on a local display operatively coupled to the control system.

14. The bearing ball inspection system of claim 13, wherein the communication interface is configured for wireless communication over a global communication network using one or more of Wi-Fi, cellular, or Bluetooth protocols.

15. The bearing ball inspection system of claim 13, wherein the inspection results transmitted by the communication interface include one or more of defect classification results, bearing ball throughput counts, or system status indicators.

16. The bearing ball inspection system of claim 13, wherein the control instructions received by the communication interface are configured to adjust one or more of camera exposure parameters, light source intensity levels, actuator timing sequences, or inspection thresholds.

17. The bearing ball inspection system of claim 13, wherein the machine learning model is further configured to be retrained using inspection data collected from a plurality of systems deployed at different physical locations, the retraining being performed by the remote data processing resource and periodically synchronized to the control system.

18. The bearing ball inspection system of claim 13, wherein the control instructions received by the communication interface include machine learning model updates, inspection threshold profiles, or actuator calibration parameters transmitted from the remote data processing resource.

19. The bearing ball inspection system of claim 13, wherein the control system is further configured to monitor component usage patterns, operational load, or failure rates, and generate predictive maintenance alerts for one or more actuators, sensors, or lighting components.

20. A method of using the bearing ball inspection system of claim 13, the method comprising the steps of:
   initiating inspection of the bearing ball;
   transmitting inspection results to the computing device or the remote data processing resource;
   receiving control instructions from the computing device or the remote data processing resource; and
   adjusting one or more system parameters based on the received control instructions.

* * * * *